US007541690B2

(12) United States Patent
Kobayashi et al.

(10) Patent No.: US 7,541,690 B2
(45) Date of Patent: Jun. 2, 2009

(54) SIGNAL TRANSMISSION METHOD, SIGNAL TRANSMISSION DEVICE, AND LIQUID CRYSTAL PROJECTOR

(75) Inventors: Kenichi Kobayashi, Kanagawa (JP); Hitoshi Akiho, Miyagi (JP); Yoshimasa Kitta, Kanagawa (JP)

(73) Assignee: Sony Corporation, Tokyo (JP)

( * ) Notice: Subject to any disclaimer, the term of this patent is extended or adjusted under 35 U.S.C. 154(b) by 401 days.

(21) Appl. No.: 11/552,370

(22) Filed: Oct. 24, 2006

(65) Prior Publication Data

US 2007/0091280 A1 Apr. 26, 2007

(30) Foreign Application Priority Data

Oct. 24, 2005 (JP) ........................... P2005-308314
May 31, 2006 (JP) ........................... P2006-151319

(51) Int. Cl.
*H02J 1/10* (2006.01)
*G01V 3/00* (2006.01)

(52) U.S. Cl. ............................ 307/19; 307/29; 307/38; 307/40; 307/11; 340/855.8; 340/855.4

(58) Field of Classification Search .................. 307/19, 307/29, 38–40, 11, 21, 24, 25, 27, 28; 340/855.8, 340/855.4
See application file for complete search history.

(56) References Cited

U.S. PATENT DOCUMENTS

2005/0154799 A1 * 7/2005 Feng et al. ..................... 710/1
2008/0152063 A1 * 6/2008 Kuo ........................... 375/362

FOREIGN PATENT DOCUMENTS

JP 10-188896 7/1998

* cited by examiner

*Primary Examiner*—Tuyet Vo
(74) *Attorney, Agent, or Firm*—K & L Gates LLP

(57) ABSTRACT

A signal transmission method for transmitting a signal between a regulated power supply unit that operates and controls a high intensity discharge lamp and a setting unit that gives various kinds of commands to the regulated power supply unit is provided. The method includes providing the regulated power supply unit with a first communication controller; providing the setting unit with a second communication controller; providing a pair of signal lines.

15 Claims, 13 Drawing Sheets

SECOND MICROCOMPUTER Tx
POWER ON
POWER OFF
100ms
100ms

SECOND MICROCOMPUTER Rx
11ms
11ms
100ms

FIRST MICROCOMPUTER Rx
Ignition
100ms

FIRST MICROCOMPUTER Tx
S1
Tx OFF

SECOND MICROCOMPUTER Tx
POWER ON
100ms
S2

SECOND MICROCOMPUTER Rx

FIRST MICROCOMPUTER Rx
100ms
Ignition
100W MODE
120W MODE
100W MODE

FIRST MICROCOMPUTER Tx
S1
11ms
11ms

FIG. 6

| OPERATION | REGULATED POWER SUPPLY UNIT I/O | | SETTING UNIT I/O | |
|---|---|---|---|---|
| | Tx | Rx | Tx | Rx |
| POWER ON | | INPUT Low 100ms+ | OUTPUT High 100ms+ | |
| POWER OFF | | INPUT High 100ms+ | OUTPUT Low 100ms+ | |
| POWER SWITCH | | INPUT 1KHz Pulse | OUTPUT 1kHz Pulse | |
| LIGHTING ACK | OUTPUT 45Hz | | | INPUT 45Hz |
| TURN-OFF ACK | OUTPUT Low | | | INPUT Low |
| IGNITION NG | OUTPUT 1kHz Pulse | | | INPUT 1kHz Pulse |

FIG. 12

| BALLAST TRANSMISSION COMMAND | |
|---|---|
| COMMAND | DATA |
| STANDBY | |
| IGNITION SUCCESS | |
| LIGHTING SUCCESS | |
| TURN-OFF | |
| INPUT VOLTAGE TRANSMISSION | INPUT VOLTAGE VALUE |
| LAMP VOLTAGE TRANSMISSION | LAMP VOLTAGE VALUE |
| TEMPERATURE TRANSMISSION | TEMPERATURE VALUE |
| INPUT VOLTAGE ABNORMALITY | INPUT VOLTAGE VALUE |
| LAMP VOLTAGE ABNORMALITY | LAMP VOLTAGE VALUE |
| TEMPERATURE ABNORMALITY | TEMPERATURE VALUE |
| POWER MODE TRANSMISSION | POWER MODE VALUE |

| SETTING TRANSMISSION COMMAND | |
|---|---|
| COMMAND | DATA |
| LIGHTING INSTRUCTION | |
| TURN-OFF INSTRUCTION | |
| POWER CHANGE INSTRUCTION | |
| POWER MODE REQUEST | |
| INPUT VOLTAGE REQUEST | |
| LAMP VOLTAGE REQUEST | |
| TEMPERATURE REQUEST | |
| ABNORMAL MODE REQUEST | |

SIGNAL TRANSMISSION METHOD, SIGNAL TRANSMISSION DEVICE, AND LIQUID CRYSTAL PROJECTOR

CROSS REFERENCES TO RELATED APPLICATIONS

The present application claims priority to Japanese Patent Application JP 2005-308314 filed with the Japanese Patent Office on Oct. 24, 2005, and Japanese Patent Application JP 2006-151319 filed with the Japanese Patent Office on May 31, 2006, the entire contents of which is being incorporated herein by reference.

BACKGROUND

The present invention relates to a signal transmission method and a signal transmission device that allow one pair of signal lines to carry out bidirectional communication between a regulated power supply unit (ballast) that stably operates and controls a high intensity discharge (HID) lamp used in a video projection device such as a projector, and a setting unit that gives various kinds of commands to this regulated power supply unit, and relates also to a liquid crystal projector employing the method or device.

A color liquid crystal projector includes a high intensity discharge lamp (hereinafter, referred to as an HID lamp) such as a metal halide lamp and a regulated power supply unit that stably operates and controls the HID lamp. The liquid crystal projector includes also a color liquid crystal panel, a diaphragm (aperture), a converging lens, a screen, and so on that are arranged in that order in front of the HID lamp. Furthermore, the projector includes a power converter that converts a DC input into power necessary for the operation of the HID lamp, a high voltage generator that ignites the HID lamp, a controller that controls the operation of the HID lamp, and so on.

Light emitted from the HID lamp in response to the lighting of the HID lamp enters the color liquid crystal panel, and an image formed of the three primary colors of the color liquid crystal panel is projected via the diaphragm and converging lens onto the screen, which allows a color image to be displayed on the screen (refer to Japanese Patent Laid-open No. Hei 10-188896).

In addition, to the regulated power supply unit, various kinds of commands are transmitted from the setting unit coupled via signal lines to the regulated power supply unit. Moreover, response signals and so on are sent back from the regulated power supply unit to the setting unit.

A description will be made below on an existing signal transmission system between a regulated power supply unit and a setting unit with reference to FIG. 13.

In FIG. 13, a regulated power supply unit 81 that stably operates and controls an HID lamp, and a setting unit 82 that gives various kinds of commands to the regulated power supply unit 81 are shown.

The regulated power supply unit 81 includes a microcomputer 811, a transmission photo-coupler 812 and a reception photo-coupler 813. The microcomputer 811 has a function to control and manage the entire regulated power supply unit 81 and a function to control communication with the setting unit 82. The photo-couplers 812 and 813 are used for the communication with the setting unit 82.

The setting unit 82 includes a microcomputer 821 that has a function to control and manage the entire setting unit 82 and a function to control communication with the regulated power supply unit 81.

The anode of an input light emitting diode 812*a* included in the transmission photo-coupler 812 is coupled via a resistor R1 to a transmission terminal Tx of the microcomputer 811, while the cathode of the light emitting diode 812*a* is connected to a ground terminal GND.

The collector and emitter of an output phototransistor 812*b* included in the transmission photo-coupler 812 are separately connected to one end of a pair of transmission-only signal lines L1 and L2, respectively, that interconnect the regulated power supply unit 81 and the setting unit 82. The other end of the signal line L1 is connected to a +5 V power supply on the setting unit side. The other end of the signal line L2 is connected to a reception terminal Rx of the microcomputer 821 of the setting unit 82, and is coupled via a resistor R5 to the ground terminal GND.

The collector of an output phototransistor 813*b* included in the reception photo-coupler 813 is connected to a reception terminal Rx of the microcomputer 811, and is coupled via a resistor R2 to a +5 V power supply. The emitter of the phototransistor 813*b* is connected to the ground terminal GND.

The anode of an input light emitting diode 813*a* included in the reception photo-coupler 813 is coupled via a resistor R3 to one end of one signal line L3 of a pair of reception-only signal lines L3 and L4 that interconnect the regulated power supply unit 81 and the setting unit 82. The cathode of the light emitting diode 813*a* is connected to one end of the other signal line L4. The other end of the signal line L3 is connected to the +5 V power supply on the setting unit side. The other end of the signal line L4 is coupled via a resistor R4 to a transmission terminal Tx of the microcomputer 821 of the setting unit 82.

In the signal transmission circuit shown in FIG. 13, when the regulated power supply unit 81 lights the HID lamp, the potential of the transmission terminal Tx of the microcomputer 821 in the setting unit 82 is switched to the "Low" level. Upon this switching, a current flows from the +5 V power supply through the light emitting diode 813*a* in the reception photo-coupler 813 via the signal lines L3 and L4. Thus, the light emitting diode 813*a* implements light emission operation, and simultaneously the phototransistor 813*b* that has received the emitted light is turned on. This ON signal is captured in the microcomputer 811 via its reception terminal Rx. The microcomputer 811 determines the status of the ON signal and controls the regulated power supply unit 81 so that the HID lamp is lit.

If the HID lamp is lit, an ignition detection circuit in the regulated power supply unit 81 detects the state where the HID lamp has been ignited due to a high voltage generated from a high voltage generator in the regulated power supply unit 81. Furthermore, based on the detection signal, the potential of the transmission terminal Tx of the microcomputer 811 in the regulated power supply unit 81 is switched to the "High" level. Upon this switching, the light emitting diode 812*a* in the transmission photo-coupler 812 implements light emission operation, and simultaneously the phototransistor 812*b* that has received the emitted light is turned on. Thus, a current flows from the +5 V power supply via the signal lines L1 and L2 and is captured in the microcomputer 821 of the setting unit 82 via its reception terminal Rx. The microcomputer 821 determines whether or not the current is a lighting acknowledgement signal from the regulated power supply unit 81, and thereby can confirm whether or not the HID lamp has been lit.

In contrast, when the HID lamp is turned off, the potential of the transmission terminal Tx of the microcomputer 821 in the setting unit 82 is switched from the "Low" level to the "High" level. Due to this switching, the HID lamp is turned off.

In the above-described existing signal transmission system, however, two signal lines need to be prepared for each of the transmission system and reception system as shown in FIG. 13. In addition, if the signal transmission system is further provided with, besides the above-described functions to light and turn-off the HID lamp, a function to switch the power mode for the HID lamp between e.g. 100 W and 120 W and other functions, there is a need to separately prepare dedicated signal lines and photo-couplers for transmitting an instruction signal for the power mode switching and so on, for each kind of instruction signal. Therefore, the numbers of signal lines and photo-couplers for interconnecting the regulated power supply unit 81 and the setting unit 82 are significantly increased, and the number of components of the signal transmission circuit is also increased. Accordingly, the existing system involves a problem of being disadvantageous in terms of costs.

SUMMARY

The present application is made in consideration of the above-described circumstances, and there is a need for the invention to provide a signal transmission method and a signal transmission device that allow bidirectional communication between a regulated power supply unit and a setting unit by use of one pair of signal lines or a power supply line from the setting unit to the regulated power supply unit, and to provide a liquid crystal projector employing the method or device.

According to an embodiment, there is provided a signal transmission method for transmitting a signal between a regulated power supply unit that operates and controls a high intensity discharge lamp and a setting unit that gives various kinds of commands to the regulated power supply unit. The method includes the steps of providing the regulated power supply unit with a first communication controller that receives the command from the setting unit to control the high intensity discharge lamp based on the command and transmits the operation state information of the high intensity discharge lamp to the setting unit, providing the setting unit with a second communication controller that transmits the command to the regulated power supply unit and receives the operation state information of the high intensity discharge lamp to execute processing appropriate to the operation state information, and providing a pair of signal lines that interconnect the regulated power supply unit and the setting unit via a transmission photo-coupler and a reception photo-coupler. The method includes also the step of implementing ON/OFF control of the transmission photo-coupler by a lighting acknowledgement signal that has a predetermined frequency and a predetermined duty ratio and is continuously sent out from a transmission terminal of the first communication controller when the high intensity discharge lamp has been lit normally based on a lighting command transmitted from the setting unit to the regulated power supply unit, and transmitting an output signal of the transmission photo-coupler associated with the ON/OFF control to the second communication controller via the signal lines. The method further includes the step of transmitting the command sent out from a transmission terminal of the second communication controller to the first communication controller via the signal lines and the reception photo-coupler during the OFF-period of the transmission photo-coupler.

According to another embodiment, there is provided a signal transmission device for transmitting a signal between a regulated power supply unit that operates and controls a high intensity discharge lamp and a setting unit that gives various kinds of commands to the regulated power supply unit. The device includes a first communication controller configured to be provided in the regulated power supply unit and receive the command from the setting unit to control the high intensity discharge lamp based on the command. The first communication controller transmits the operation state information of the high intensity discharge lamp to the setting unit. The device includes also a second communication controller configured to be provided in the setting unit and transmit the command to the regulated power supply unit. The second communication controller receives the operation state information of the high intensity discharge lamp to execute processing appropriate to the operation state information. The device further includes a reception photo-coupler configured to be connected to a reception terminal of the first communication controller, a transmission photo-coupler configured to be connected to a transmission terminal of the first communication controller, and a pair of signal lines configured to interconnect the regulated power supply unit and the setting unit via the reception photo-coupler and the transmission photo-coupler. In the device, ON/OFF control of the transmission photo-coupler is implemented by a lighting acknowledgement signal that has a predetermined frequency and a predetermined duty ratio and is continuously sent out from the transmission terminal of the first communication controller when the high intensity discharge lamp has been lit normally based on a lighting command transmitted from the setting unit to the regulated power supply unit, so that an output signal of the transmission photo-coupler associated with the ON/OFF control is transmitted to the second communication controller via the signal lines. Furthermore, the command sent out from a transmission terminal of the second communication controller is transmitted to the first communication controller via the signal lines and the reception photo-coupler during the OFF-period of the transmission photo-coupler.

According to another embodiment, there is provided a liquid crystal projector that includes a regulated power supply unit configured to operate and control a high intensity discharge lamp, a setting unit configured to give various kinds of commands to the regulated power supply unit, and a signal transmission circuit configured to carry out communication between the regulated power supply unit and the setting unit. The regulated power supply unit includes a first communication controller that receives the command from the setting unit to control the high intensity discharge lamp based on the command and transmits the operation state information of the high intensity discharge lamp to the setting unit. The setting unit includes a second communication controller that transmits the command to the regulated power supply unit and receives the operation state information of the high intensity discharge lamp to execute processing appropriate to the operation state information. The signal transmission circuit includes a reception photo-coupler connected to a reception terminal of the first communication controller, a transmission photo-coupler connected to a transmission terminal of the first communication controller, and a pair of signal lines that interconnect the regulated power supply unit and the setting unit via the reception photo-coupler and the transmission photo-coupler. In the projector, ON/OFF control of the transmission photo-coupler is implemented by a lighting acknowledgement signal that has a predetermined frequency and a predetermined duty ratio and is continuously sent out from the transmission terminal of the first communication controller when the high intensity discharge lamp has been lit normally based on a lighting command transmitted from the setting unit to the regulated power supply unit, so that an output signal of the transmission photo-coupler associated with the ON/OFF control is transmitted to the second communication controller via the signal lines. Furthermore, the command sent out from a transmission terminal of the second communication controller is transmitted to the first communication controller via the signal lines and the reception photo-coupler during the OFF-period of the transmission photo-coupler.

According to another embodiment, there is provided another signal transmission method for transmitting a signal between a regulated power supply unit that operates and controls a high intensity discharge lamp and a setting unit that gives various kinds of commands to the regulated power supply unit. The method includes the steps of providing a communication/power combined line wired between the regulated power supply unit and the setting unit, providing the setting unit with a constant-voltage constant-current circuit that supplies power necessary for drive control of the regulated power supply unit via the communication/power combined line, providing the regulated power supply unit with a first communication controller that receives the command to control the high intensity discharge lamp based on the command and transmits the operation state information of the high intensity discharge lamp to the setting unit, and providing the setting unit with a second communication controller that transmits the command to the regulated power supply unit and receives the operation state information of the high intensity discharge lamp to execute processing appropriate to the operation state information. The method further includes the step of modulating by the first communication controller a constant voltage applied from the constant-voltage constant-current circuit to the communication/power combined line depending on the operation state information to be sent out from the first communication controller to thereby produce a modulated wave arising from changes of the level of the constant voltage to the High/Low levels, and transmitting the modulated wave to the second communication controller as a transmission signal. The method includes also the step of modulating by the second communication controller a constant voltage applied from the constant-voltage constant-current circuit to the communication/power combined line depending on a command to be sent out from the second communication controller to thereby produce a modulated wave arising from changes of the level of the constant voltage to the High/Low levels, and transmitting the modulated wave to the first communication controller as a transmission signal.

According to another embodiment, there is provided another signal transmission device for transmitting a signal between a regulated power supply unit that operates and controls a high intensity discharge lamp and a setting unit that gives various kinds of commands to the regulated power supply unit. The device includes a communication/power combined line configured to be wired between the regulated power supply unit and the setting unit, a constant-voltage constant-current circuit configured to be provided in the setting unit and supply power necessary for drive control of the regulated power supply unit via the communication/power combined line, and a first communication controller configured to be provided in the regulated power supply unit and receive the command to control the high intensity discharge lamp based on the command. The first communication controller transmits the operation state information of the high intensity discharge lamp to the setting unit. The device includes also a second communication controller configured to be provided in the setting unit and transmit the command to the regulated power supply unit. The second communication controller receives the operation state information of the high intensity discharge lamp to execute processing appropriate to the operation state information. The first communication controller modulates a constant voltage applied from the constant-voltage constant-current circuit to the communication/power combined line depending on the operation state information to be sent out from the first communication controller to thereby produce a modulated wave arising from changes of the level of the constant voltage to the High/Low levels, and transmits the modulated wave to the second communication controller as a transmission signal. Furthermore, the second communication controller modulates a constant voltage applied from the constant-voltage constant-current circuit to the communication/power combined line depending on a command to be sent out from the second communication controller to thereby produce a modulated wave arising from changes of the level of the constant voltage to the High/Low levels, and transmits the modulated wave to the first communication controller as a transmission signal.

According to another embodiment, there is provided a liquid crystal projector that includes a regulated power supply unit configured to operate and control a high intensity discharge lamp, a setting unit configured to give various kinds of commands to the regulated power supply unit, and a communication/power combined line configured to be wired between the regulated power supply unit and the setting unit. The setting unit includes a constant-voltage constant-current circuit that supplies power necessary for drive control of the regulated power supply unit via the communication/power combined line. The regulated power supply unit includes a first communication controller that receives the command to control the high intensity discharge lamp based on the command and transmits the operation state information of the high intensity discharge lamp to the setting unit. The setting unit includes a second communication controller that transmits the command to the regulated power supply unit and receives the operation state information of the high intensity discharge lamp to execute processing appropriate to the operation state information. The first communication controller modulates a constant voltage applied from the constant-voltage constant-current circuit to the communication/power combined line depending on the operation state information to be sent out from the first communication controller to thereby produce a modulated wave arising from changes of the level of the constant voltage to the High/Low levels, and transmits the modulated wave to the second communication controller as a transmission signal. Furthermore, the second communication controller modulates a constant voltage applied from the constant-voltage constant-current circuit to the communication/power combined line depending on a command to be sent out from the second communication controller to thereby produce a modulated wave arising from changes of the level of the constant voltage to the High/Low levels, and transmits the modulated wave to the first communication controller as a transmission signal.

In the signal transmission method and device according to embodiments, ON/OFF control of the transmission photo-coupler is implemented by the lighting acknowledgement signal that has a predetermined frequency and duty ratio and is sent out from the first communication controller when the high intensity discharge lamp has been controlled to be lit normally based on a lighting command transmitted from the setting unit to the regulated power supply unit, so that an output signal of the transmission photo-coupler associated with the ON/OFF control is transmitted to the second communication controller via the signal lines. Furthermore, the command sent out from the transmission terminal of the second communication controller is transmitted to the first communication controller via the signal lines and the reception photo-coupler during the OFF-period of the transmission photo-coupler. Therefore, even if the number of kinds of transmission signal is increased, bidirectional communication between the regulated power supply unit and the setting unit can be carried out without congestion by use of the pair of single lines irrespective of this transmission signal increase. Thus, the number of signal lines can be greatly reduced and the number of components of the signal transmission circuit also can be reduced. In addition, multi-functions can be offered through software modification.

In the liquid crystal projector according to another embodiment, ON/OFF control of the transmission photo-coupler is implemented by the lighting acknowledgement signal that has a predetermined frequency and duty ratio and is sent out from the first communication controller when the high intensity discharge lamp has been controlled to be lit normally based on a lighting command transmitted from the setting unit to the regulated power supply unit, so that an output signal of the transmission photo-coupler associated with the ON/OFF control is transmitted to the second communication controller via the signal lines. Furthermore, the command sent out from the transmission terminal of the second communication controller is transmitted to the first communication controller via the signal lines and the reception photo-coupler during the OFF-period of the transmission photo-coupler. Therefore, in control of operation of the high intensity discharge lamp in the liquid crystal projector, even if the number of kinds of transmission signal is increased, bidirectional communication between the regulated power supply unit and the setting unit can be carried out without congestion by use of the pair of single lines irrespective of this transmission signal increase. Thus, the number of signal lines can be greatly reduced and the number of components of the signal transmission circuit also can be reduced. In addition, multi-functions can be offered through software modification.

In the signal transmission method and device according to an embodiment, the first communication controller modulates a constant voltage applied from the constant-voltage constant-current circuit to the communication/power combined line depending on the operation state information to be sent out from the first communication controller to thereby produce a modulated wave arising from changes of the level of the constant voltage to the High/Low levels, and transmits the modulated wave to the second communication controller as a transmission signal. Furthermore, the second communication controller modulates a constant voltage applied from the constant-voltage constant-current circuit to the communication/power combined line depending on a command to be sent out from the second communication controller to thereby produce a modulated wave arising from changes of the level of the constant voltage to the High/Low levels, and transmits the modulated wave to the first communication controller as a transmission signal. Therefore, even if the number of kinds of transmission signal is increased, bidirectional communication between the regulated power supply unit and the setting unit can be carried out without congestion by use of the power supply line irrespective of this transmission signal increase. Thus, signal lines can be eliminated and the number of components in the circuit serving as the signal transmission path also can be reduced. In addition, multi-functions can be offered through software modification.

In the liquid crystal projector according to another embodiment, the first communication controller modulates a constant voltage applied from the constant-voltage constant-current circuit to the communication/power combined line depending on the operation state information to be sent out from the first communication controller to thereby produce a modulated wave arising from changes of the level of the constant voltage to the High/Low levels, and transmits the modulated wave to the second communication controller as a transmission signal. Furthermore, the second communication controller modulates a constant voltage applied from the constant-voltage constant-current circuit to the communication/power combined line depending on a command to be sent out from the second communication controller to thereby produce a modulated wave arising from changes of the level of the constant voltage to the High/Low levels, and transmits the modulated wave to the first communication controller as a transmission signal. Therefore, even if the number of kinds of transmission signal is increased, bidirectional communication between the regulated power supply unit and the setting unit can be carried out without congestion by use of the power supply line irrespective of this transmission signal increase. Thus, signal lines can be eliminated and the number of components in the circuit serving as the signal transmission path also can be reduced. In addition, multi-functions can be offered through software modification.

Additional features and advantages are described herein, and will be apparent from, the following Detailed Description and the figures.

BRIEF DESCRIPTION OF THE FIGURES

FIG. 6 is a diagram showing I/O truth values that indicate the input/output states of the transmission and reception terminals of the regulated power supply unit and the setting unit in the embodiment.

FIG. 12 is a diagram showing samples of transmission commands and data from the regulated power supply unit and the setting unit in the second embodiment.

DETAILED DESCRIPTION

Signal transmission methods, signal transmission devices and liquid crystal projectors employing any of these methods and devices according to embodiments will be described below with reference to the drawings. It should be noted that signal transmission methods, signal transmission devices, liquid crystal projectors and electronic apparatuses that employ any of these methods and devices according to embodiments are not limited to the following embodiments.

Figure 1:
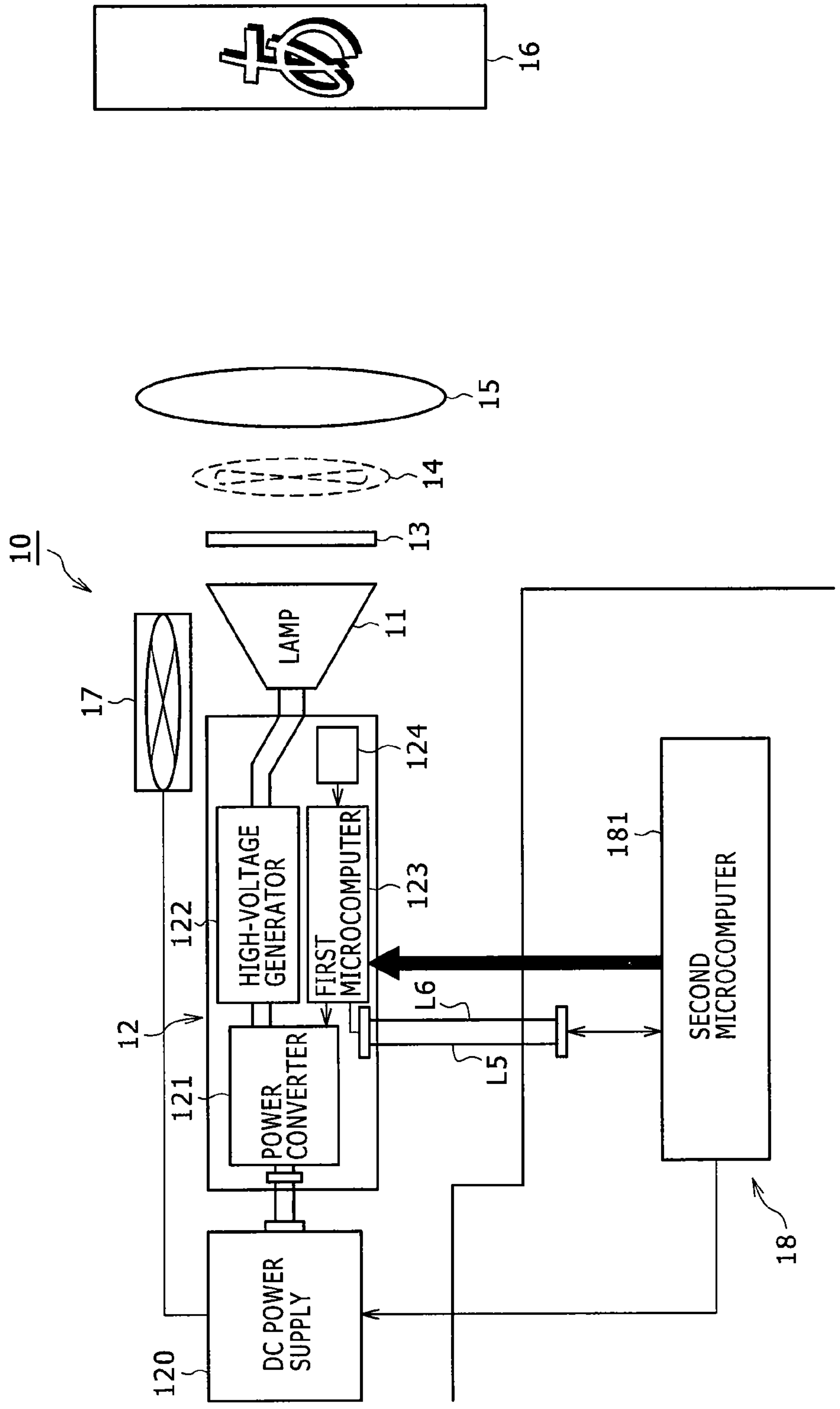
FIG. 1 is a schematic diagram showing the entire configuration of a color liquid crystal projector to which a signal transmission method according to an embodiment.
Figure 2:
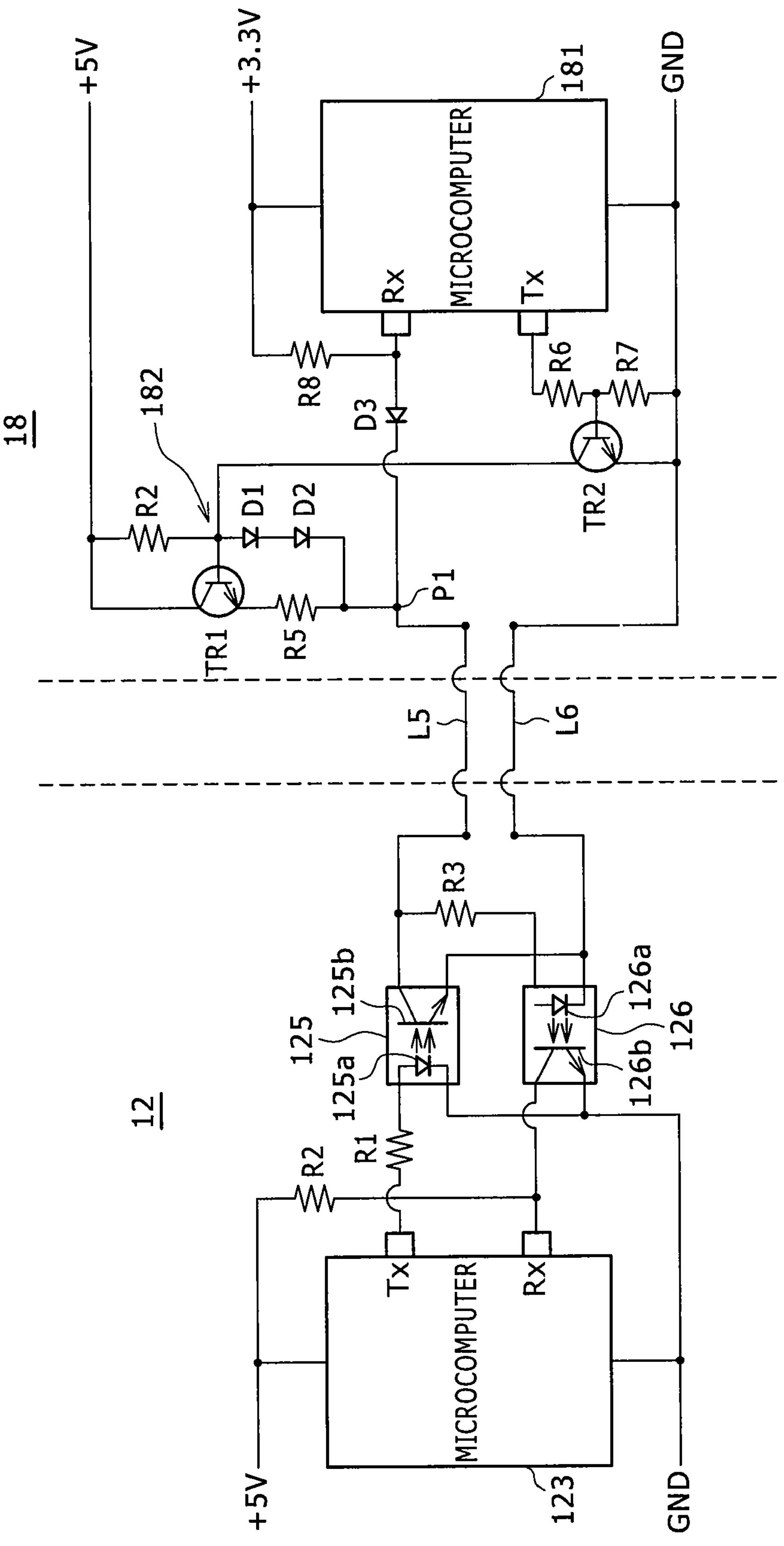
FIG. 2 is a circuit arrangement diagram of a circuit for signal transmission between a regulated power supply unit and a setting unit in the embodiment.

FIG. 1 is a schematic diagram showing the entire configuration of a color liquid crystal projector to which a signal transmission method according to an embodiment is applied. FIG. 2 is a circuit arrangement diagram of a signal transmission device between a regulated power supply unit and a setting unit according to a first embodiment of the invention. FIGS. 3A to 5D are timing charts for explaining the operation of the regulated power supply unit and the setting unit in the first embodiment. FIG. 6 is a diagram showing I/O truth values that indicate the input/output states of the transmission and reception terminals of the regulated power supply unit and the setting unit in the first embodiment.

Referring to FIG. 1, a color liquid crystal projector 10 includes a high intensity discharge lamp (hereinafter, referred to as an HID lamp) 11 such as a metal halide lamp, a regulated power supply unit 12 that stably operates and controls the HID lamp 11, a color liquid crystal panel 13, a diaphragm (aperture) 14, a conversing lens 15, and a screen 16 that are arranged in that order in front of the HID lamp 11. Furthermore, the projector 10 includes also a fan 17 for cooling the HID lamp 11, a setting unit 18 that gives various kinds of commands to the regulated power supply unit 12, and so on.

The regulated power supply unit 12 includes a DC power supply 120, a power converter 121 that converts DC power from the DC power supply 120 into AC power having a frequency necessary for the lighting of the HID lamp 11, and a high voltage generator 122 that ignites the HID lamp 11. Furthermore, the regulated power supply unit 12 includes also a first microcomputer (it corresponds to the first communication controller set forth in the claims) 123 that controls the lighting of the HID lamp 11 and controls communication with the setting unit 18, an ignition detection circuit 124 that detects the state where the HID lamp 11 has been ignited due to a high voltage from the high voltage generator 122, and so on. In addition, the projector 10 is configured so that three-primary-color images of the color liquid crystal panel 13 and the aperture of the diaphragm 14 can be controlled by the first microcomputer 123. The fan 17 is driven by power extracted from the DC power supply 120.

The setting unit 18 includes a second microcomputer (it corresponds to the second communication controller set forth in the claims) 181. The second microcomputer 181 transmits various kinds of commands to the first microcomputer 123 in the regulated power supply unit 12. Furthermore, the second microcomputer 181 receives information such as the operation state information of the HID lamp 11 transmitted from the first microcomputer 123 and executes processing appropriate to the information. The second microcomputer 181 and the first microcomputer 123 are coupled to each other by a signal transmission line including a pair of signal lines L5 and L6 so that bidirectional communication therebetween is allowed. In addition, the second microcomputer 181 can transmit to the first microcomputer 123 instructions relating to three-primary-color images of the color liquid crystal panel 13 and the aperture of the diaphragm 14. Moreover, the second microcomputer 181 can transmit a power-on instruction to the DC power supply 120 in the regulated power supply unit 12.

The circuit configuration for the signal transmission between the regulated power supply unit 12 and the setting unit 18 will be described below with reference to FIG. 2.

Referring to FIG. 2, the regulated power supply unit 12 includes, besides the first microcomputer 123, a transmission photo-coupler 125 and a reception photo-coupler 126 that are used for communication with the setting unit 18.

The anode of an input light emitting diode (light-emitting element) 125*a* included in the transmission photo-coupler 125 is coupled via a resistor R1 to a transmission terminal Tx of the first microcomputer 123, while the cathode of the light emitting diode 125*a* is connected to a ground terminal GND on the first microcomputer side.

The collector and emitter of an output phototransistor (light-receiving element) 125*b* included in the transmission photo-coupler 125 are connected to one end of a pair of signal lines L5 and L6, respectively, that interconnect the regulated power supply unit 12 and the setting unit 18.

The anode of an input light emitting diode (light-emitting element) 126*a* included in the reception photo-coupler 126 is coupled via a resistor R3 to one end of one signal line L5, while the cathode of the light emitting diode 126*a* is connected to the other signal line L6.

The collector of an output phototransistor (light-receiving element) 126*b* included in the reception photo-coupler 126 is connected to a reception terminal Rx of the first microcomputer 123. The emitter of the phototransistor 126*b* is coupled via a resistor R2 to a +5 V power supply.

The transmission photo-coupler 125, the reception photo-coupler 126, and the signal lines L5 and L6 serve as a signal transmission line that interconnects the regulated power supply unit 12 and the setting unit 18.

As shown in FIG. 2, the setting unit 18 includes a constant-current circuit 182 in addition to the second microcomputer 181. This constant-current circuit 182 includes a transistor TR1 for a constant current, a transistor TR2 that controls the switching of the transistor TR1, a resistor R4 connected between the collector and base of the transistor TR1, and a resistor R5 connected to the emitter of the transistor TR1. The constant-current circuit 182 includes also diodes D1 and D2 connected between the base of the transistor TR1 and the resistor R4, and bias resistors R6 and R7 connected to the base of the transistor TR2.

In the constant-current circuit 182 with this configuration, the emitter of the transistor TR1 is coupled via the resistor R5 to the other end of one signal line L5, and the other end of the signal line L5 is coupled via a reverse-blocking diode D3 to a reception terminal Rx of the second microcomputer 181. Furthermore, the base of the transistor TR2 is coupled via the bias resistor R6 to a transmission terminal Tx of the second microcomputer 181. The collector of the transistor TR1 is connected to a +5 V power supply, and the other end of the signal line L6 is connected to a ground terminal GND on the second microcomputer side. In addition, the reception terminal Rx of the second microcomputer 181 is pulled up via a resistor R8 to +3.3 V as a driving supply voltage.

The operation of the first embodiment will be described below with reference to FIGS. 2 to 5D.

Figures 3A, 3B, 3C, 3D:
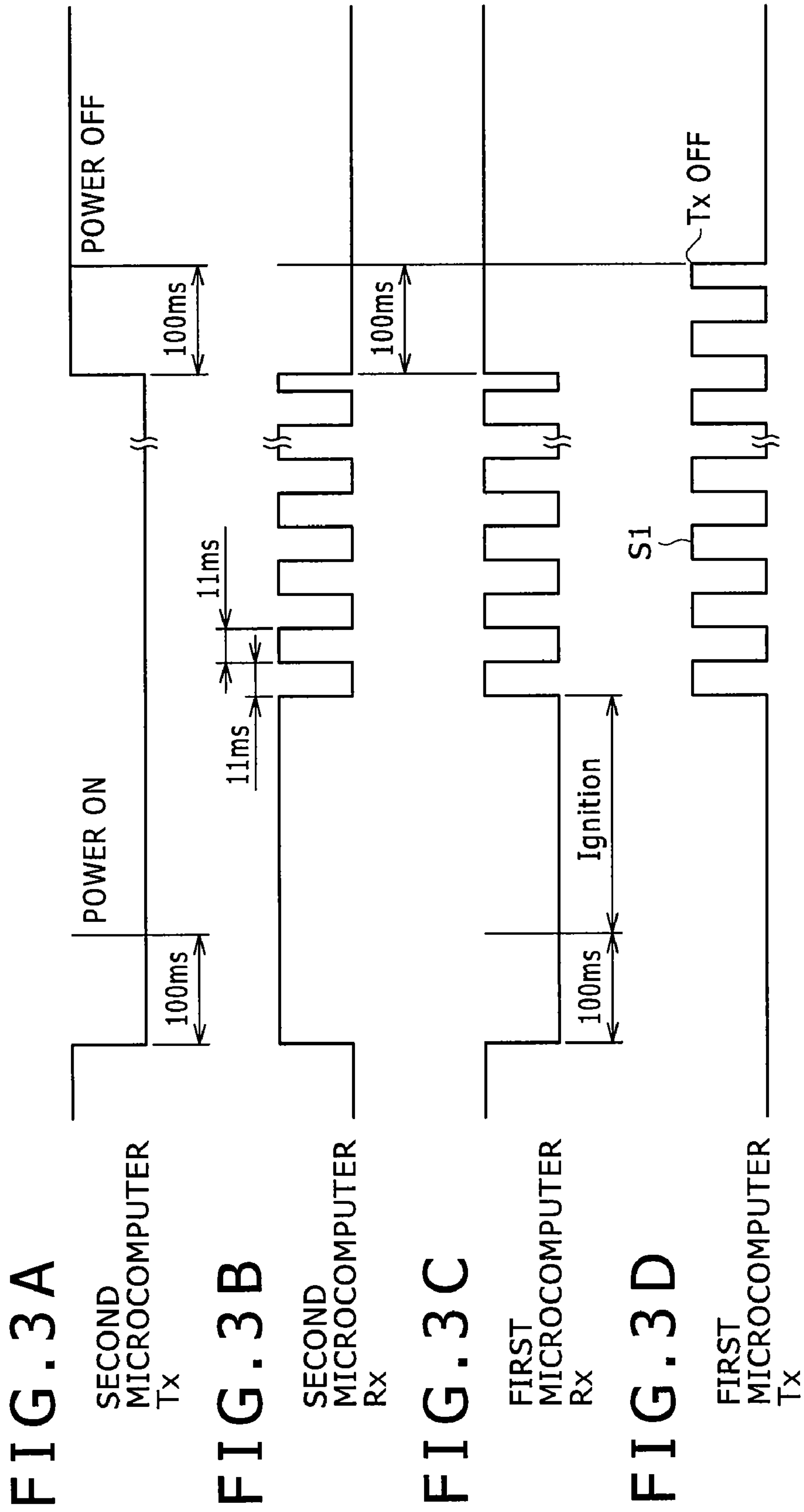
FIGS. 3A to 3D are a timing chart for explaining the operation of the regulated power supply unit and the setting unit when an HID lamp shown in the embodiment is lit.

When the HID lamp 11 is lit, the potential of the transmission terminal Tx of the second microcomputer 181 in the setting unit 18 is switched from the "High" level to the "Low" level as shown in FIG. 3A. Due to this switching, the transistor TR2 is turned off and hence the transistor TR1 is turned on in the constant-current circuit 182. Thus, a voltage of +5 V is applied to a connecting node P1 to the signal line L5, which changes the potential at the connecting node P1 from the "Low" level to the "High" level. Simultaneously, the potential of the reception terminal Rx of the second microcomputer 181 is changed to the "High" level as shown in FIG. 3B.

Furthermore, the turning-on of the transistor TR1 causes a current to flow from the constant-current circuit 182 through the light emitting diode 126*a* via the path of the signal line L5—the resistor R3—the light emitting diode 126*a* in the reception photo-coupler 126—the signal line L6—the ground terminal GND. Thus, the light emitting diode 126*a* implements light emission operation. Therefore, the phototransistor 126*b* that has received the emitted light is turned on, and the ON signal is captured in the first microcomputer 123 through its reception terminal Rx. At this time, the potential of the reception terminal Rx is changed from the "High" level to the "Low" level as shown in FIG. 3C. The first microcomputer 123 determines whether or not the state where the potential of the reception terminal Rx is at the "Low" level has continued for e.g. 100 ms. If the first microcomputer 123 has determined that the state has continued for 100 ms, the first microcomputer 123 determines that a lighting instruction has been issued, and induces transition to ignition operation. Specifically, the DC power supply 120 is driven in response to a power-on instruction from the second microcomputer 181, and the power converter 121 in the regulated power supply unit 12 is driven in response to a lighting instruction from the first microcomputer 123. Due to this operation, an output voltage from the power converter 121 is supplied to the HID lamp 11. Furthermore, a high voltage pulse is generated from the high voltage generator 122 and is applied to the HID lamp 11, so that the HID lamp 11 is ignited and lit. If the HID lamp 11 is normally lit due to this operation, light emitted from the HID lamp 11 enters the color liquid crystal panel 13, and an image formed of the three primary colors of the color liquid crystal panel 13 is projected via the diaphragm 14 and the converging lens 15 onto the screen 16, which allows a color image to be displayed on the screen 16.

If the state where the HID lamp 11 has been ignited and lit normally is detected by the ignition detection circuit 124 and the detection signal is captured in the first microcomputer 123, a lighting acknowledgement signal S1 having a predetermined duty ratio and frequency like one shown in FIG. 3D is sent out from the transmission terminal Tx of the first microcomputer 123. The signal S1 of FIG. 3D has a cycle of 22 ms, a pulse width of 11 ms, and a frequency of 45 Hz for example. When this lighting acknowledgement signal S1 is applied to the light emitting diode 125*a* in the transmission photo-coupler 125, the light emitting diode 125*a* intermittently emits light in synchronization with the lighting acknowledgement signal S1, so that the phototransistor 125*b* in the transmission photo-coupler 125 is turned on and off in synchronization with this intermittent light. Due to this switching operation, an output signal having a waveform like one shown in FIG. 3B is sent out to the output side of the transmission photo-coupler 125. This output signal is input via the signal lines L5 and L6 to the reception terminal Rx of the second microcomputer 181. Thus, the second microcomputer 181 receives the lighting acknowledgement signal S1 having the waveform like that shown in FIG. 3B, and thereby can recognize that the HID lamp 11 has been lit normally.

Thereafter, when the HID lamp 11 is turned off, the potential of the transmission terminal Tx of the second microcomputer 181 in the setting unit 18 is switched from the "Low" level to the "High" level as shown in FIG. 3A. This signal is received by the first microcomputer 123 through the signal lines L5 and L6 and the reception photo-coupler 126, and the first microcomputer 123 controls the regulated power supply unit 12 so that the unit 12 is stopped and thus the HID lamp 11 is turned off after 100 ms. Simultaneously with this turning-off, the sending-out of the lighting acknowledgement signal S1 from the transmission terminal Tx of the first microcomputer 123 is stopped.

A description will be made below on the operation for switching the power mode for the HID lamp 11 in the state where the HID lamp 11 has been lit normally with reference to FIGS. 4A to 4D.

In the example of FIGS. 4A to 4D, the power modes for the HID lamp include the 100 W mode and 120 W mode. A command for the power mode switching is sent out from the second microcomputer 181 during the OFF-period of the transmission photo-coupler 125 that is in synchronization with the lighting acknowledgement signal S1 shown in FIG. 4D. In one cycle of the lighting acknowledgement signal S1, one 11-ms-period during which the signal level is at the "High" level is allocated to transmission from the viewpoint of the regulated power supply unit 12, while the other 11-ms-period corresponding to the "Low" level is allocated to reception.

Specifically, in normal lighting control in which the power mode is not changed, the regulated power supply unit 12 (first microcomputer 123) holds the lighting signal when being in the transmission state during the 11-ms-period corresponding to the "High" level in one cycle of the lighting acknowledgement signal S1. In contrast, when being in the reception state during the 11-ms-period corresponding to the "Low" level, the regulated power supply unit 12 waits a command from the setting unit 18.

Figures 4A, 4B, 4C, 4D:
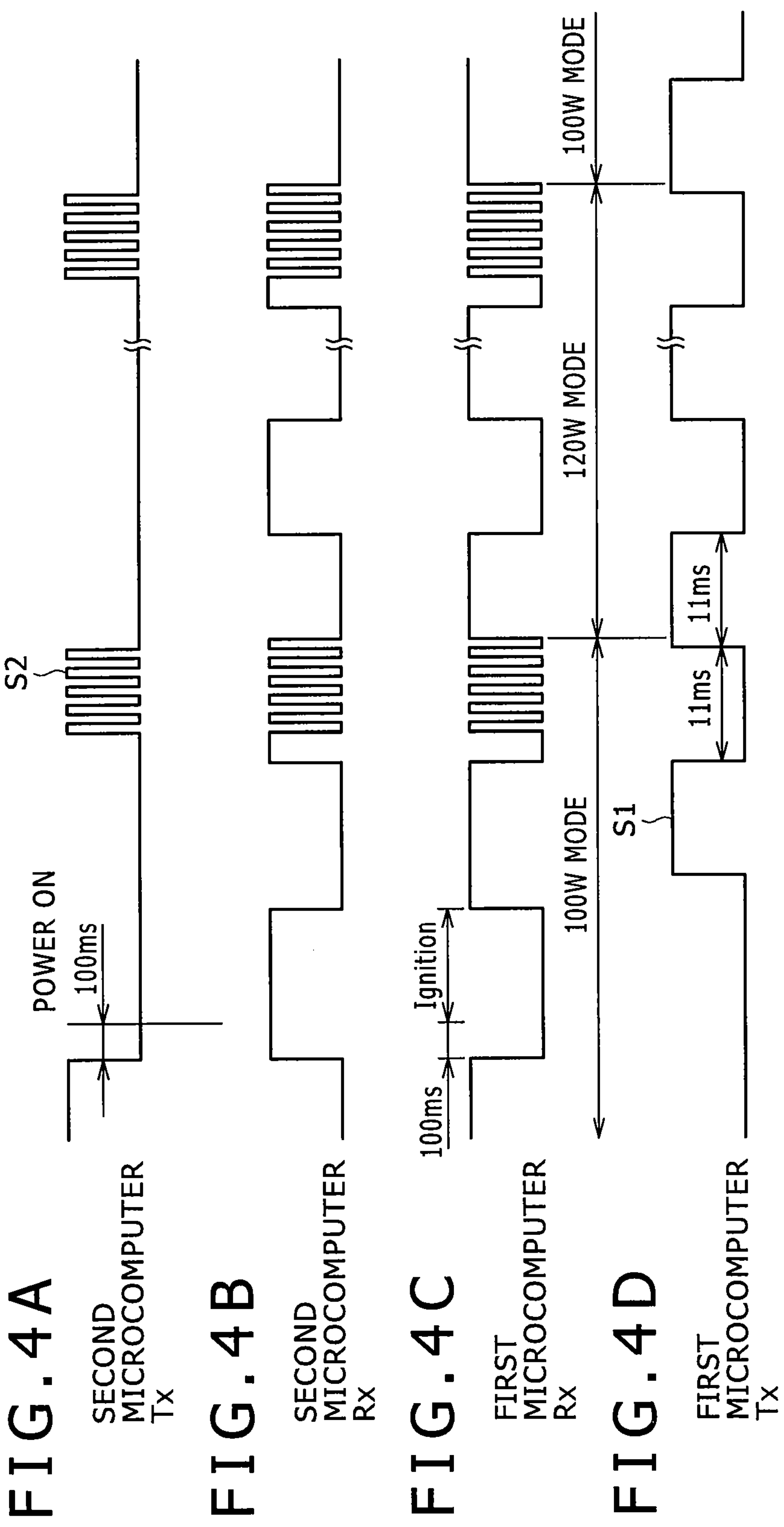
FIGS. 4A to 4D are a timing chart for explaining the operation of the regulated power supply unit and the setting unit when the power mode for the HID lamp shown in the embodiment is switched.

Therefore, when the power mode is switched, a burst power switch signal S2 with a frequency of 1 kHz is sent out from the transmission terminal Tx of the second microcomputer 181 at a timing like one shown in FIG. 4A in synchronization with the "Low" level period of the lighting acknowledgement signal S1 shown in FIG. 4D. At this time, the transmission photo-coupler 125 is in the OFF-state. Therefore, when the power switch signal S2 sent out from the transmission terminal Tx of the second microcomputer 181 is applied to the base of the transistor TR2 in the constant-current circuit 182, the switching of the transistor TR1 occurs due to the transistor TR2. Thus, the light emitting diode 126*a* in the reception photo-coupler 126 implements light emission operation with a frequency of 1 kHz, and the phototransistor 126*b* is operated due to the emitted light. Accordingly, a signal having the waveform shown in FIG. 4C is captured in the first microcomputer 123 through its reception terminal Rx. Furthermore, the reception terminal Rx of the second microcomputer 181 is supplied with a signal having the waveform shown in FIG. 4B, which arises from inversion of a signal having the waveform shown in FIG. 4C.

In the above-described manner, the power switch signal S2 sent out from the second microcomputer 181 can be transmitted to the first microcomputer 123 through the signal lines L5 and L6 and the reception photo-coupler 126. The first microcomputer 123 that has received the power switch signal S2 can control the regulated power supply unit 12 so that the power mode for the HID lamp 11 is switched by recognizing the power switch signal S2.

In addition, if the power switch signal S2 is sent out from the second microcomputer 181 again after the first sending-out thereof from the second microcomputer 181 as shown in FIG. 4A, the first microcomputer 123 can control the regulated power supply unit 12 so that the power mode for the HID lamp 11 is switched from 100 W to 120 W, or from 120 W to 100 W for example.

The operation when the HID lamp 11 has failed to be lit will be described below with reference to FIGS. 5A to 5D.

Figures 5A, 5B, 5C, 5D:
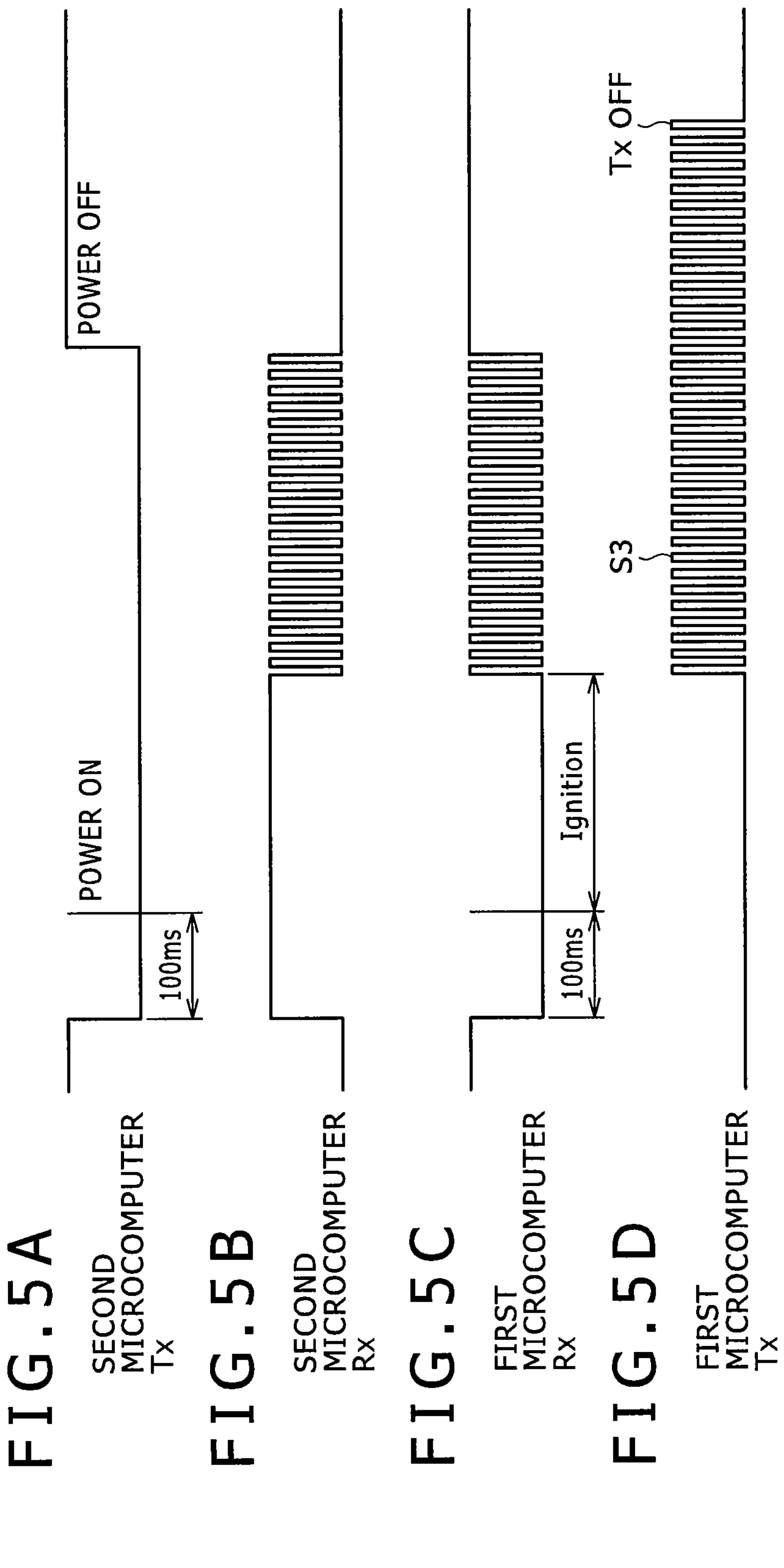
FIGS. 5A to 5D are a timing chart for explaining the operation of the regulated power supply unit and the setting unit when the HID lamp shown in the embodiment has failed to be lit.

When the potential of the transmission terminal Tx of the second microcomputer 181 is switched from the "High" level to the "Low" level as shown in FIG. 5A, a lighting command is transmitted to the first microcomputer 123. If it is determined that the first microcomputer 123 cannot acknowledge the ignition of the HID lamp 11 even after the continuation of the "Low" level state for 100 ms, a lighting failure signal S3 as a 1-kHz-pulse shown in FIG. 5D is continuously sent out from the transmission terminal Tx of the first microcomputer 123. When this lighting failure signal S3 is received by the second microcomputer 181 through the transmission photo-coupler 125 and the signal lines L5 and L6, the second microcomputer 181 recognizes that the HID lamp 11 has failed to be lit. At the timing when the second microcomputer 181 has recognized the failure of the lighting of the HID lamp 11, the potential of the transmission terminal Tx of the second microcomputer 181 is changed from the "Low" level to the "High" level as shown in FIG. 5A so that a stop instruction is transmitted to the first microcomputer 123. In the above-described operation, the potential applied to the reception terminal Rx of the second microcomputer 181 has a waveform like one shown in FIG. 5B, and the potential applied to the reception terminal Rx of the first microcomputer 123 has a waveform like one shown in FIG. 5C.

FIG. 6 shows the I/O truth values of the transmission terminals Tx and the reception terminals Rx of the first and second microcomputers 123 and 181 in the regulated power supply unit 12 and the setting unit 18 for the following operations: power on, power off, power mode switching, lighting acknowledgement, turn-off acknowledgement, and ignition NG.

According to the first embodiment, ON/OFF control of the transmission photo-coupler 125 is implemented by the lighting acknowledgement signal S1 that has a predetermined frequency and duty ratio and is sent out from the first microcomputer 123 when the HID lamp 11 has been controlled to be lit normally based on a lighting command transmitted from the second microcomputer 181 of the setting unit 18 to the first microcomputer 123 of the regulated power supply unit 12 through the signal lines L5 and L6 and the reception photo-coupler 126, so that an output signal of the transmission photo-coupler 125 associated with this ON/OFF control is transmitted to the second microcomputer 181 through the signal lines L5 and L6. Furthermore, a command for lighting, power mode switching, or so on sent out from the transmission terminal Tx of the second microcomputer 181 is transmitted to the first microcomputer 123 through the signal lines L5 and L6 and the reception photo-coupler 126 during the OFF-period of the transmission photo-coupler 125. Therefore, the "High" level period and the "Low" level period of the lighting acknowledgement signal S1 can be allocated to bidirectional transmission and reception between the first microcomputer 123 and the second microcomputer 181. Thus, the signal transmission line can be formed only of the pair of signal lines L5 and L6, the transmission photo-coupler 125, and the reception photo-coupler 126. Furthermore, even if the number of kinds of transmission signal is increased, bidirectional communication between the regulated power supply unit 12 and the setting unit 18 can be carried out without congestion by use of the single transmission line irrespective of this transmission signal increase. This feature offers advantages that the number of signal lines can be greatly reduced and the number of components of the signal transmission circuit also can be reduced, and that multi-functions can be offered through software modification.

A second embodiment of the invention will be described below.

Figure 7:
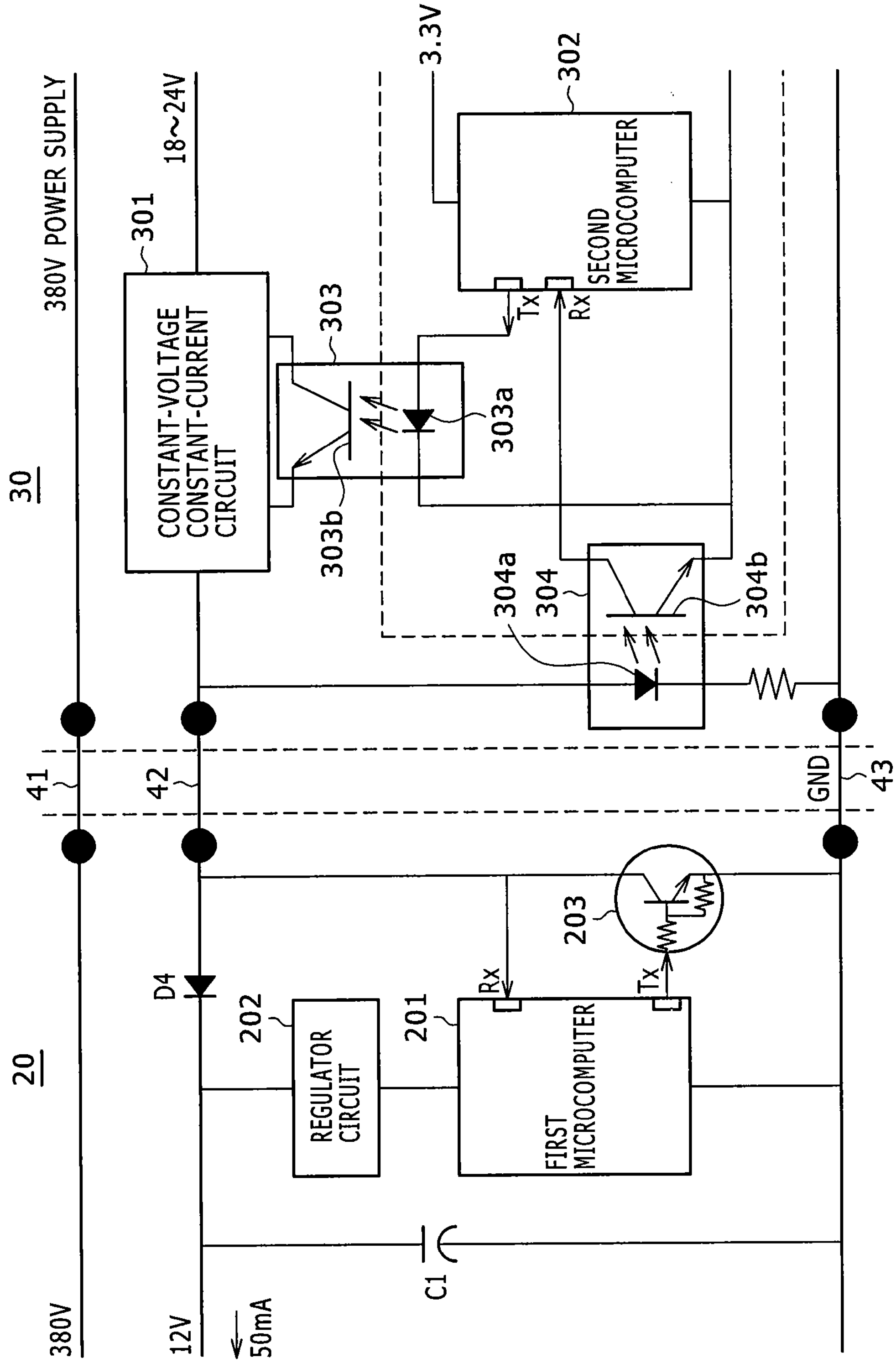
FIG. 7 is a circuit arrangement diagram of a signal transmission device according to a second embodiment.
Figure 8:
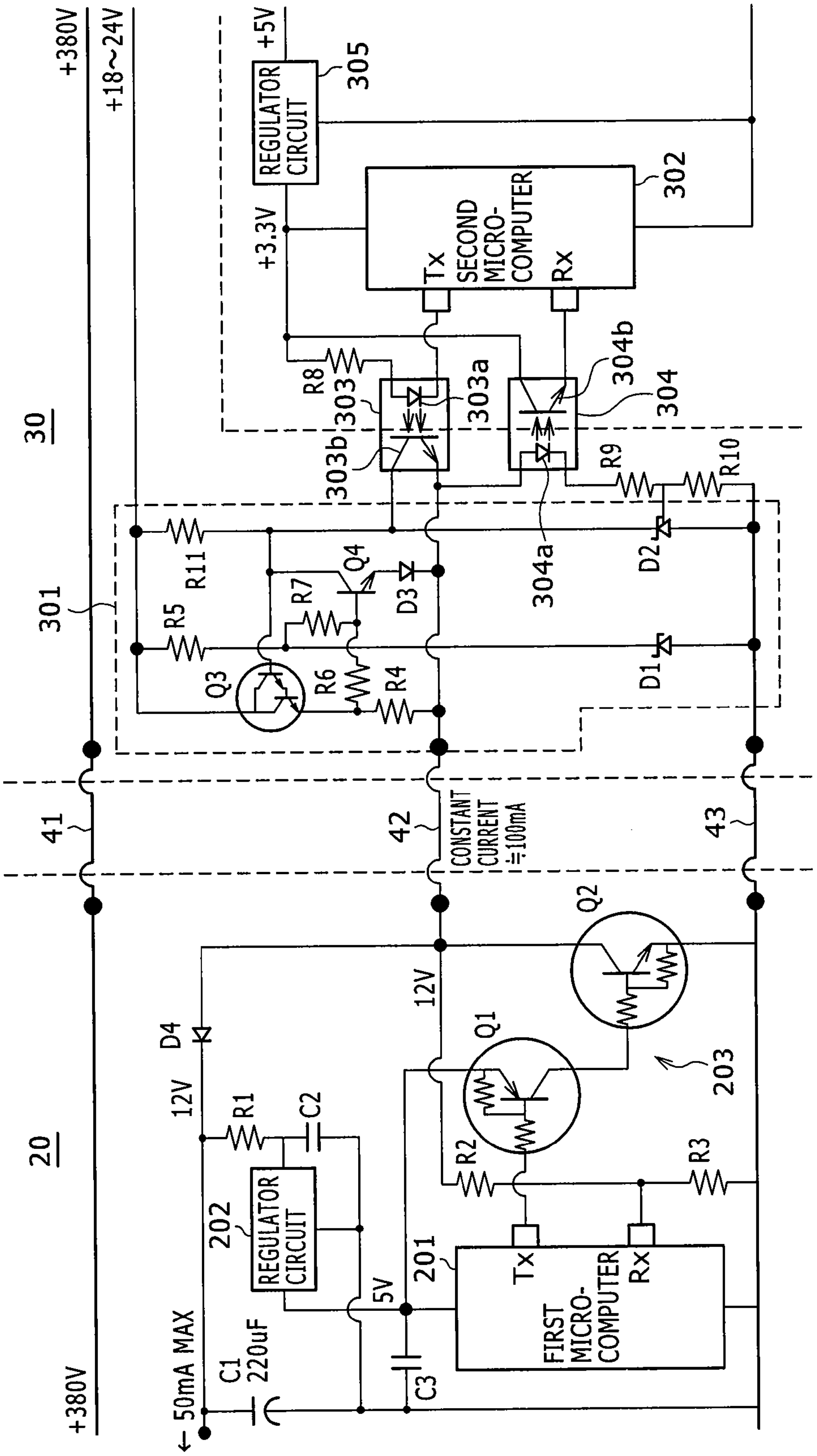
FIG. 8 is a circuit diagram showing details of the circuit configuration of a regulated power supply unit and a setting unit in the second embodiment.
Figure 9:
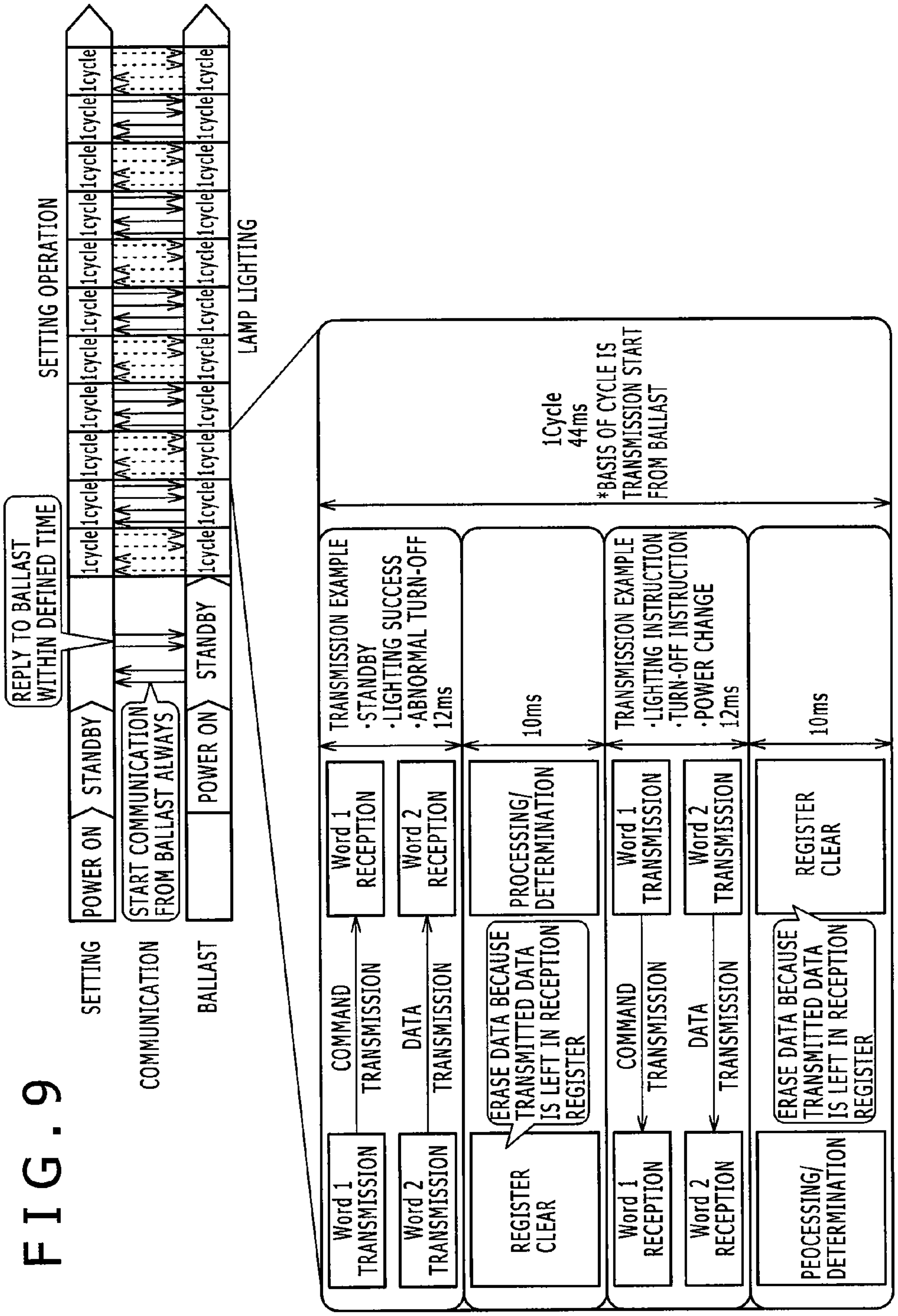
FIG. 9 is an explanatory diagram showing the procedure of communication between the regulated power supply unit and the setting unit in the second embodiment.

FIG. 7 is a circuit arrangement diagram of a signal transmission device according to the second embodiment. FIG. 8 is a circuit diagram showing details of the circuit arrangement of a regulated power supply unit and a setting unit in the second embodiment. FIG. 9 is an explanatory diagram showing the procedure of communication between the regulated power supply unit and the setting unit in the second embodiment. FIGS. 10A to 10E are a timing chart for explaining the operation of the regulated power supply unit and the setting unit in the second embodiment. FIG. 11 is a diagram showing the fold-back type drooping characteristic of a constant-voltage constant-current circuit in the second embodiment. FIG. 12 is a diagram showing samples of transmission commands and data from the regulated power supply unit and the setting unit in the second embodiment.

Referring to FIG. 7, a signal transmission device used in a color liquid crystal projector includes a regulated power supply unit 20 that operates and controls an HID lamp and a setting unit 30 that gives various kinds of commands to the regulated power supply unit 20. Between the regulated power supply unit 20 and the setting unit 30, power supply lines 41 and 42 are provided. The power supply line 41 supplies power (e.g., 380 V) from the setting unit 30 to an high intensity discharge lamp drive circuit (not shown) in the regulated power supply unit 20. The power supply line 42 supplies power (e.g., 12 V) from the setting unit 30 to an HID lamp drive controller (not shown) in the regulated power supply unit 20, and serves also as a communication line. The HID lamp drive controller is operated by power supplied via the power supply line 42, and controls the high intensity discharge lamp drive circuit and so on.

A voltage of 380 V to be supplied to the power supply line 41 is generated by a power supply equipped with a power factor correction circuit (not shown). Power to be supplied to the power supply line 42 is extracted from this power supply. Furthermore, the power supply line 42 is utilized also for signal transmission between the regulated power supply unit 20 and the setting unit 30. Therefore, the power supply line 42 will be referred to as a communication/power combined line hereinafter. In addition, reference numeral 43 shown in FIG. 7 indicates a ground line provided between the regulated power supply unit 20 and the setting unit 30.

As shown in FIG. 7, the regulated power supply unit 20 includes a first microcomputer (it corresponds to the first communication controller set forth in the claims) 201 that controls the operation of the HID lamp and controls communication with the setting unit 30, and an electrolytic capacitor C1 for charging connected between the communication/power combined line 42 and the ground line 43. The regulated power supply unit 20 includes also a regulator circuit 202 that produces a drive control voltage (e.g., 5 V) to be supplied to the first microcomputer 201, and a reverse-blocking diode D4 that is connected in series to the communication/power combined line 42 in the regulated power supply unit 20 and prevents power charged to the electrolytic capacitor C1 from reversely flowing toward the setting unit 30. In addition, the regulated power supply unit 20 includes a transmission output element 203, a power converter that converts DC power supplied through the power supply line 41 into AC power having a frequency necessary for the lighting of the HID lamp, and a high voltage generator that ignites the HID lamp (neither the power converter nor the high voltage generator is shown in the diagram, but both are included in the high intensity discharge lamp drive circuit).

The electrolytic capacitor C1 is charged by power (e.g., 12.5 V) supplied through the communication/power combined line 42. The charged power is supplied to the high intensity discharge lamp drive circuit and the regulator circuit 202 in the regulated power supply unit 20 when the communication/power combined line 42 is being used for communication between the regulated power supply unit 20 and the setting unit 30, in order to prevent failure of the functions of the high intensity discharge lamp drive circuit and the first microcomputer 201.

The transmission output element 203 is to send out to the communication/power combined line 42 information such as the operation state information of the HID lamp transmitted from the first microcomputer 201. As shown in FIG. 8, the transmission output element 203 is formed of two transistors Q1 and Q2 connected in series to each other. The base of the transistor Q1 is connected to a transmission terminal Tx of the first microcomputer 201, and the collector and emitter of the transistor Q2 are connected between the communication/power combined line 42 and the ground line 43.

A reception terminal Rx of the first microcomputer 201 is coupled to the communication/power combined line 42 and the ground line 43 via resistors R2 and R3, respectively, as shown in FIG. 8. Furthermore, between the input terminal of the regulator circuit 202 and the communication/power combined line 42, a noise filter formed of a resistor R1 and a capacitor C2 is provided as shown in FIG. 8.

Referring back to FIG. 7, the setting unit 30 includes a constant-voltage constant-current circuit 301 that produces power based on a voltage (e.g., 12 V) necessary for drive control of the regulated power supply unit 20 from a voltage of 18 to 24 V extracted from the power supply and supplies the produced power to the regulated power supply unit 20 through the communication/power combined line 42. The setting unit 30 includes also a second microcomputer (it corresponds to the second communication controller set forth in the claims) 302, a transmission photo-coupler 303 and a reception photo-coupler 304. The photo-couplers 303 and 304 allow signal transmission in the state where the primary side corresponding to the power supply side separated by the dashed line is electrically isolated from the secondary side corresponding to the second microcomputer side.

The second microcomputer 302 transmits various kinds of commands to the first microcomputer 201 in the regulated power supply unit 20. Furthermore, the second microcomputer 302 receives information such as the operation state information of the HID lamp transmitted from the first microcomputer 201 and executes processing appropriate to the information. The communication between the second microcomputer 302 and the first microcomputer 201 is carried out through the transmission output element 203, the transmission photo-coupler 303 and the reception photo-coupler 304 via the communication/power combined line 42.

The constant-voltage constant-current circuit 301 has an overcurrent limiting function based on a fold-back type drooping characteristic like one shown in FIG. 11. As shown in FIG. 8, the constant-voltage constant-current circuit 301 is formed of a control transistor Q3 of which emitter and collector are connected in series to the communication/power combined line 42, a differential amplifier transistor Q4 that amplifies the difference between a reference value and a detected value. The constant-voltage constant-current circuit 301 includes also a zener diode D1 and resistors R5 to R7 that are coupled to the base of the differential amplifier transistor Q4 and are provided for bias setting. Furthermore, the constant-voltage constant-current circuit 301 includes also a zener diode D2 and a resistor R11 that are connected to the control transistor Q3 and are provided for bias setting, a diode D3 connected to the emitter of the differential amplifier transistor Q4, and so on.

As shown in FIG. 8, the anode of an input light emitting diode 303*a* included in the transmission photo-coupler 303 is coupled via a resistor R8 to the output terminal of a regulator circuit 305 that produces a drive control voltage (e.g., 3.3 V) and supplies it to the second microcomputer 302. The cathode of the light emitting diode 303*a* is connected to a transmission terminal Tx of the second microcomputer 302.

In addition, the collector of an output phototransistor (light-receiving element) 303*b* included in the transmission photo-coupler 303 is coupled via the resistor R11 to the input line of the constant-voltage constant-current circuit 301, while the emitter thereof is connected to the communication/power combined line 42.

As shown in FIG. 8, the anode of an input light emitting diode 304*a* included in the reception photo-coupler 304 is connected to the communication/power combined line 42, and the cathode thereof is coupled via resistors R9 and R10 to the ground line 43. Furthermore, the collector of an output phototransistor (light-receiving element) 304*b* included in the reception photo-coupler 304 is connected to the output terminal of the regulator circuit 305, while the emitter thereof is connected to a reception terminal Rx of the second microcomputer 302.

The operation of the second embodiment will be described below with reference to FIGS. 7 to 10E.

The cycle of communication between the regulated power supply unit 20 and the setting unit 30 is on the basis of the start of transmission from the regulated power supply (ballast) unit 20, and is set to a predetermined time period (e.g., 1 cycle=44 ms).

For example, as shown in FIG. 9, the setting unit 30 is powered on so as to be put on standby, and the regulated power supply unit 20 is also powered on so as to be put on standby, so that the standby information of the regulated power supply unit 20 is transmitted to the setting unit 30 to thereby start communication from the regulated power supply unit 20. Subsequently, in response to the transmitted information from the regulated power supply unit 20, the setting unit 30 transmits command information such as a lighting instruction to the regulated power supply unit 20 within defined time.

Such a communication cycle is repeatedly executed and the timings of transmission and reception of the regulated power supply unit 20 and the setting unit 30 are determined for every cycle, in order to eliminate collisions between transmission signals when communication is being carried out between the regulated power supply unit 20 and the setting unit 30 through the same communication/power combined line 42, and thus allow assured bidirectional communication.

FIG. 9 shows a communication procedure for the case where information transmitted in one time of transmission is composed of two words and communication is carried out at a speed of 2400 bit/s. Two upward arrowheads indicate two words transmitted in one cycle and the timing of transmission from the regulated power supply unit 20 to the setting unit 30. Two downward arrowheads indicate two words transmitted in one cycle and the timing of transmission from the setting unit 30 to the regulated power supply unit 20. The communication procedure in one cycle will be described below with reference to FIG. 9.

Initially, Word 1 (command) is transmitted from the regulated power supply unit 20 to the setting unit 30 through the communication/power combined line 42, followed by transmission of Word 2 (data) from the regulated power supply unit 20 to the setting unit 30. As is apparent from FIGS. 7 and 8, the reception terminal Rx of the first microcomputer 201 is connected to the communication/power combined line 42. Therefore, the data transmitted from the transmission terminal Tx of the first microcomputer 201 via the transmission output element 203 to the communication/power combined line 42 is captured in the first microcomputer 201 through its reception terminal Rx so as to be stored in a reception register (not shown) included in the first microcomputer 201.

To address this, in the present embodiment, register clear processing for erasing the data stored in the reception register is executed so that data from the setting unit 30 can be read.

The setting unit 30 receives Words 1 and 2 from the regulated power supply unit 20 and processes the received data, to thereby determine the received content and start transmission processing dependent upon the received content. The setting unit 30 transmits Word 1 (command) to the regulated power supply unit 20 through the communication/power combined line 42, and then transmits Word 2 (data) to the regulated power supply unit 20.

As is apparent from FIG. 8, the reception terminal Rx of the second microcomputer 302 is coupled via the reception photo-coupler 304 to the communication/power combined line 42. Therefore, the data transmitted from the transmission terminal Tx of the second microcomputer 302 via the transmission photo-coupler 303 to the communication/power combined line 42 is captured in the second microcomputer 302 through its reception terminal Rx so as to be stored in a reception register (not shown) included in the second microcomputer 302.

To address this, in the present embodiment, register clear processing for erasing the data stored in the reception register is executed so that data from the regulated power supply unit 20 can be read.

The regulated power supply unit 20 that has received Words 1 and 2 from the setting unit 30 processes the received data, to thereby determine the received content and control the HID lamp.

Examples of transmission commands and data from the regulated power supply unit (ballast) and transmission commands from the setting unit are shown in FIG. 12.

Examples of transmission commands from the regulated power supply unit (ballast) are as follows: standby, ignition success, lighting success, and turn-off. Examples of transmission data from the regulated power supply unit (ballast) include an input voltage value corresponding to an input voltage transmission command and a lamp voltage value corresponding to a lamp voltage transmission command.

Examples of transmission commands from the setting unit are as follows: lighting instruction, turn-off instruction, voltage change instruction, power mode request, input voltage request.

In the example of FIG. 12, depending on the transmission content, only a command is transmitted or a command combined with data is transmitted. However, the case is also possible where use of data transmission is unnecessary in all communication. Furthermore, commands and data are not limited to those shown in FIG. 12.

The operation of the regulated power supply unit 20 and the setting unit 30 will be described below with reference to FIGS. 8 and 10A to 10E.

Referring to FIG. 8, when communication between the regulated power supply unit 20 and the setting unit 30 is not carried out in the state where both the regulated power supply unit 20 and the setting unit 30 have been powered on, the electrolytic capacitor C1 is charged by a voltage (e.g., 12.5 V, 100 mA) supplied from the constant-voltage constant-current circuit 301 through the communication/power combined line 42 and the reverse-blocking diode D4, and supplies a voltage of e.g. 12 V and 50 mA to the ballast controller including the HID lamp drive controller.

When communication is carried out between the regulated power supply unit 20 and the setting unit 30 through the communication/power combined line 42, the level of the voltage on the communication/power combined line 42 is switched to the High/Low state on each one bit basis depending on transmission content. Therefore, during the communication, power for the HID lamp drive controller in the regulated power supply unit 20 is covered by the power charged to the electrolytic capacitor C1. In this configuration, the communication standards (baud rate and data amount) are defined depending on the response performance of the hardware and the charging/discharging capability of the electrolytic capacitor C1.

Figures 10A, 10B, 10C, 10D, 10E:
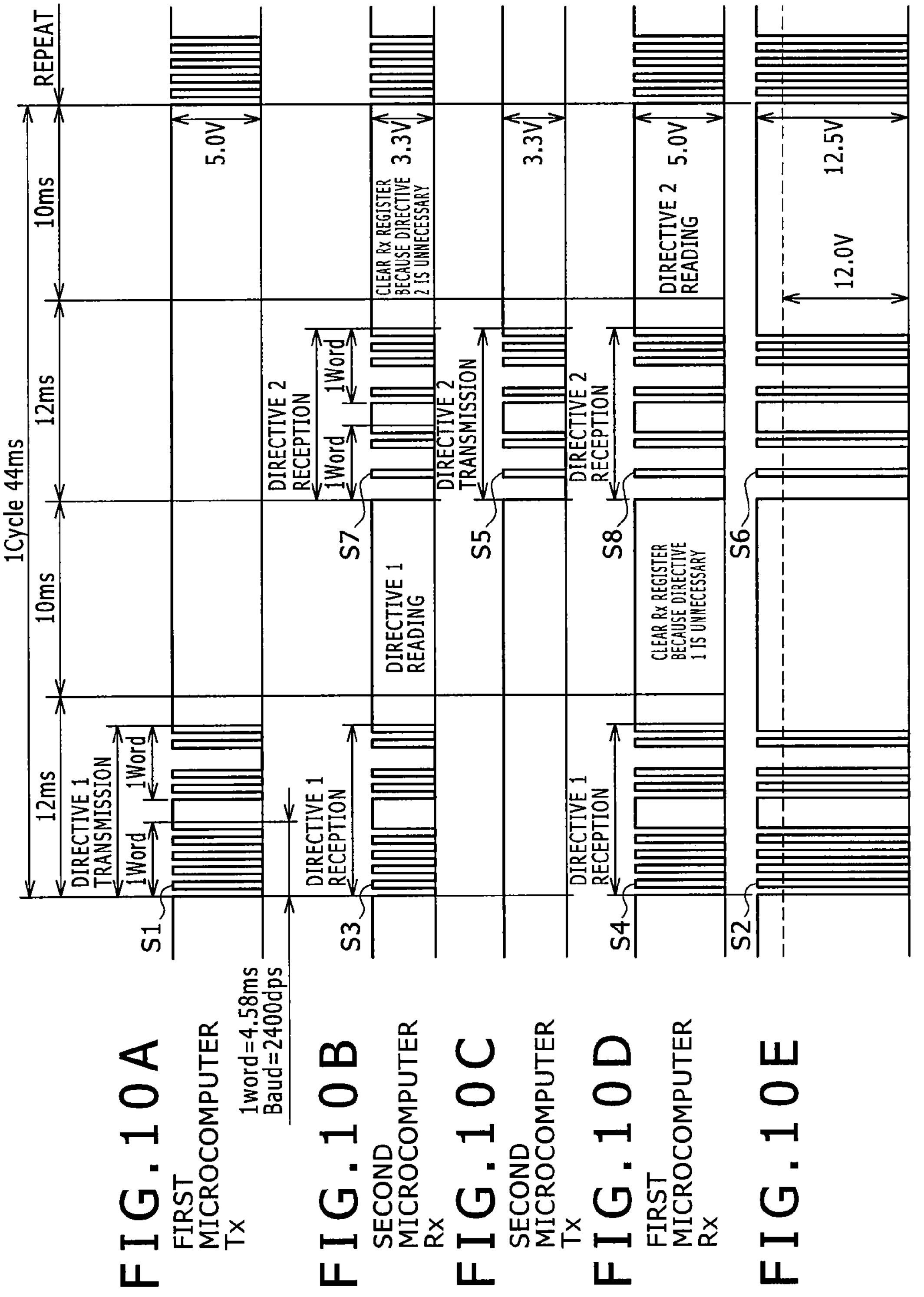
FIGS. 10A to 10E are a timing chart for explaining the operation of the regulated power supply unit and the setting unit in the second embodiment.
Figure 11:
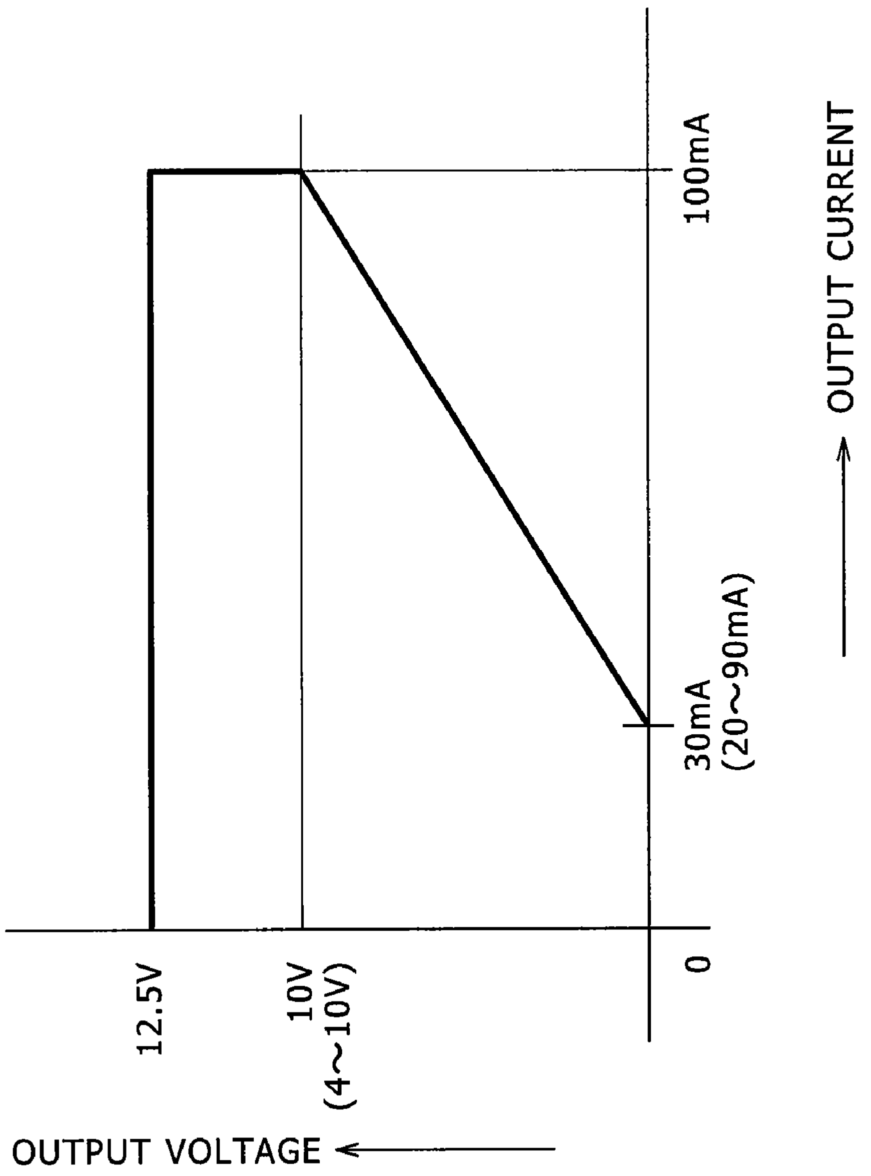
FIG. 11 is a diagram showing the fold-back type drooping characteristic of a constant-voltage constant-current circuit in the second embodiment.
Figure 13:
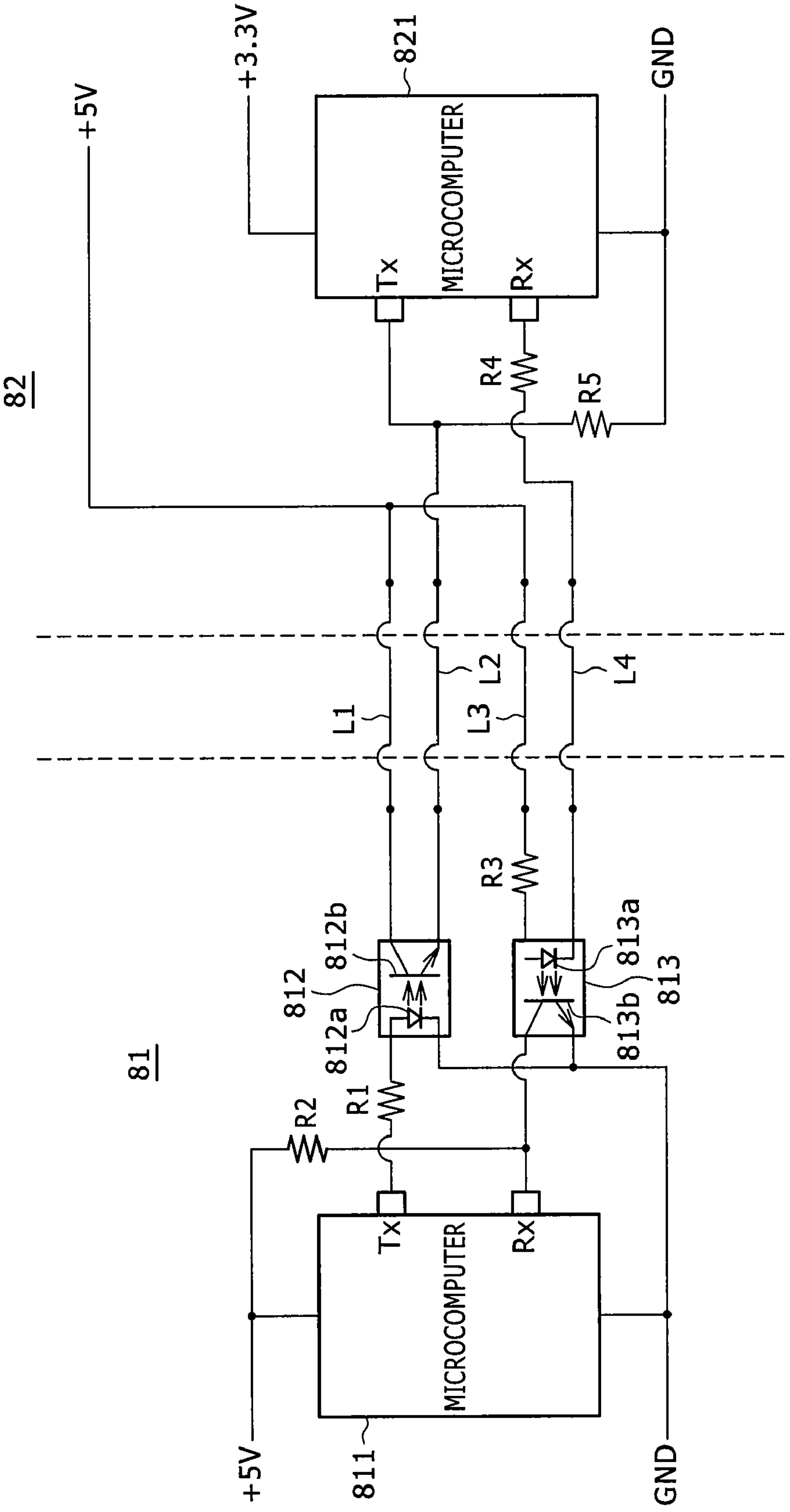
FIG. 13 is a circuit arrangement diagram of an existing circuit for signal transmission between a regulated power supply unit and a setting unit.

In the configuration of FIG. 8, if Directive 1 based on the specification of 2 words and 2400 bit/s shown in FIG. 10A is output from the transmission terminal Tx of the first microcomputer 201 during the initial 12-ms-period in one cycle (44 ms), the ON/OFF operation of the transmission output element 203 is offered by a pulse train signal S1 dependent upon the transmission content of this Directive 1. Upon the switching ON/OFF of the transmission output element 203, the voltage (12.5 V) applied from the constant-voltage constant-current circuit 301 to the communication/power combined line 42 is modulated in synchronization with the ON/OFF operation of the transmission output element 203, so that a pulse train modulated wave S2 like one shown in FIG. 10E having a waveform similar to that of the pulse train signal S1 is produced. This modulated wave S2 is transmitted to the setting unit 30 as the transmission signal of Directive 1.

When the transistor Q2 included in the transmission output element 203 is switched on by the pulse train signal S1, the communication/power combined line 42 is short-circuited to the ground line 43 via the transistor Q2, which induces the flow of an overcurrent. However, this overcurrent is suppressed by the constant-voltage constant-current circuit 301, which has a fold-back type drooping characteristic like that shown in FIG. 11.

In the transmission of Directive 1, because the reception terminal Rx of the first microcomputer 201 is connected to the communication/power combined line 42, a signal S4 is captured in the first microcomputer 201 through its reception terminal Rx as shown in FIG. 10D so as to be stored in the reception register (not shown) included in the first microcomputer 201. This signal S4 is equivalent to the pulse train signal S1 of Directive 1 sent out from the transmission terminal Tx of the first microcomputer 201 to the communication/power combined line 42 via the transmission output element 203. Because this signal S4 is unnecessary, the first microcomputer 201 erases the signal S4 stored in the reception register in the 10-ms-period subsequent to the 12-ms-period for the transmission of Directive 1.

When the pulse train modulated wave S2 carried on the output voltage (12.5 V) of the constant-voltage constant-current circuit 301 is applied to the light emitting diode 304*a* of the reception photo-coupler 304 in the setting unit 30, this light emitting diode 304*a* emits light in accordance with the modulated wave S2. Thus, in response to this light emission operation, the ON/OFF operation of the phototransistor 304*b* of the reception photo-coupler 304 is obtained. Through this operation, a signal S3 having a pulse train waveform like one shown in FIG. 10B is captured in the second microcomputer 302 through its reception terminal Rx, and this signal S3 is read in the register (not shown) of the second microcomputer 302 in the subsequent 10-ms-period.

In addition, during the period when the data of Directive 1 stored in the reception register of the first microcomputer 201 is erased, the second microcomputer 302 in the setting unit 30 processes and determines the received signal S3, to thereby decide Directive 2 as a reply to Directive 1 from the regulated power supply unit 20. This Directive 2 is also composed of data based on the specification of 2 words and 2400 bit/s similarly to Directive 1, and is transmitted as a pulse train signal S5 dependent upon the transmission content of Directive 2 as shown in FIG. 10C.

The pulse train signal S5 corresponding to Directive 2 is output from the transmission terminal Tx of the second microcomputer 302 to the transmission photo-coupler 303 in the 12-ms-period subsequent to the 10-ms-period for the reading of Directive 1. When this pulse train signal S5 is applied to the light emitting diode 303*a* in the transmission photo-coupler 303, the light emitting diode 303*a* emits light in accordance with the signal S5. Thus, in response to this light emission operation, the ON/OFF operation of the phototransistor 303*b* in the transmission photo-coupler 303 is obtained.

Upon the switching ON/OFF of the phototransistor 303*b*, the voltage (12.5 V) applied from the constant-voltage constant-current circuit 301 to the communication/power combined line 42 is modulated in synchronization with the ON/OFF operation of the phototransistor 303*b*, so that a pulse train modulated wave S6 like one shown in FIG. 10E having a waveform similar to that of the pulse train signal S5 is produced. This modulated wave S6 is transmitted to the regulated power supply unit 20 as the transmission signal of Directive 2. In the transmission of Directive 2, the reception photo-coupler 304 is also operated by the pulse train signal S5 because the light emitting diode 304*a* in the reception photo-coupler 304 is connected to the communication/power combined line 42. As a result, a signal S7 having a waveform like one shown in FIG. 10B is captured in the second microcomputer 302 through the reception terminal Rx thereof so as to be stored in the reception register (not shown) included in the second microcomputer 302. Because this signal S7 is unnecessary, the second microcomputer 302 erases the signal S7 stored in the reception register in the 10-ms-period subsequent to the 12-ms-period for the transmission of Directive 2.

The pulse train modulated wave S6 carried on the output voltage (12.5 V) of the constant-voltage constant-current circuit 301 is captured as a reception signal S8 of Directive 2 in the first microcomputer 201 via the resistors R2 and R3 through the reception terminal Rx of the first microcomputer 201. Furthermore, this signal S8 is read in the register (not shown) of the first microcomputer 201 in the subsequent 10-ms-period.

The above-described operation sequence corresponds to the communication protocol of one cycle. Repeating this operation sequence allows the setting unit 30 to control the regulated power supply unit 20.

Also after the above-described operation sequence, information corresponding to the respective ballast transmission commands and setting transmission commands shown in FIG. 12 can be transmitted between the regulated power supply unit 20 and the setting unit 30 in a similar manner.

According to the second embodiment, the first microcomputer 201 in the regulated power supply unit 20 modulates the voltage applied from the constant-voltage constant-current circuit 301 to the communication/power combined line 42 by use of the signal S1 dependent upon operation state information to be sent out from the first microcomputer 201, to thereby produce the modulated wave S2 changing in a pulse train manner and transmit the modulated wave S2 to the second microcomputer 302 as a transmission signal. Furthermore, the second microcomputer 302 in the setting unit 30 modulates the voltage applied from the constant-voltage constant-current circuit 301 to the communication/power combined line 42 by use of the signal S5 dependent upon a command to be sent out from the second microcomputer 302, to thereby produce the modulated wave S6 changing in a pulse train manner and transmit the modulated wave S6 to the first microcomputer 201 as a transmission signal. Therefore, even if the number of kinds of transmission signal is increased, bidirectional communication between the regulated power supply unit 20 and the setting unit 30 can be carried out without congestion by use of the power supply line 42 irrespective of this transmission signal increase. This feature offers advantages that signal lines can be eliminated and the number of components in the circuit serving as the signal transmission path and receiving connectors and harnesses for the communication cable can be reduced, and that multi-functions can be offered through software modification.

Moreover, according to the second embodiment, the electrolytic capacitor C1 that is charged by the constant-voltage constant-current circuit 301 through the communication/power combined line 42 is provided in the regulated power supply unit 20. Therefore, when the first microcomputer 201 and the second microcomputer 302 are transmitting data, power for the regulated power supply unit 20 and the HID lamp drive controller can be covered by power charged to the electrolytic capacitor C1.

In the description of the signal transmission system of the first embodiment, explanations have been made about signal transmission when the following operations are carried out: control of lighting and turning-off of the HID lamp 11, switching of the power mode for the HID lamp 11, and acknowledgement of lighting of the HID lamp 11. However, embodiments of the present invention are not limited to these operations but can be used also for signal transmission and reception relating to other function control operations, such as detection and determination of breakdown and lifetime of the HID lamp 11. The kinds of signal used for other operations can be assured by changing the frequency, phase or so on of the signal.

In addition, the communication pattern used in embodiments of the invention is not limited to the specification of 2-word configuration and 2400 bit/s, but the number of words and the baud rate can be optionally defined through adjustment of the cycle time and hardware.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A signal transmission method for transmitting a signal between a regulated power supply unit that operates and controls a high intensity discharge lamp and a setting unit that gives various kinds of commands to the regulated power supply unit, the method comprising the steps of:

providing the regulated power supply unit with a first communication controller that receives the command from the setting unit to control the high intensity discharge lamp based on the command and transmits operation state information of the high intensity discharge lamp to the setting unit;

providing the setting unit with a second communication controller that transmits the command to the regulated power supply unit and receives operation state information of the high intensity discharge lamp to execute processing appropriate to the operation state information;

providing a pair of signal lines that interconnect the regulated power supply unit and the setting unit via a transmission photo-coupler and a reception photo-coupler;

implementing ON/OFF control of the transmission photo-coupler by a lighting acknowledgement signal that has a predetermined frequency and a predetermined duty ratio and is continuously sent out from a transmission terminal of the first communication controller when the high intensity discharge lamp has been lit normally based on a lighting command transmitted from the setting unit to the regulated power supply unit, and transmitting an output signal of the transmission photo-coupler associated with the ON/OFF control to the second communication controller via the signal lines; and transmitting the command sent out from a transmission terminal of the second communication controller to the first communication controller via the signal lines and the reception photo-coupler during an OFF-period of the transmission photo-coupler.

2. The signal transmission method according to claim 1, wherein the second communication controller includes a constant-current circuit that supplies a current to an output light-receiving element included in the transmission photo-coupler when the output light-receiving element is in an ON-state, and supplies a current to an input light-emitting element included in the reception photo-coupler when the input light-emitting element is in an ON-state.

3. The signal transmission method according to claim 1, wherein a signal that has a predetermined frequency and indicates failure of lighting is continuously output from the transmission terminal of the first communication controller when the high intensity discharge lamp has failed to be lit normally.

4. A signal transmission device for transmitting a signal between a regulated power supply unit that operates and controls a high intensity discharge lamp and a setting unit that gives various kinds of commands to the regulated power supply unit, the device comprising:

a first communication controller configured to be provided in the regulated power supply unit and receive the command from the setting unit to control the high intensity discharge lamp based on the command, the first communication controller transmitting operation state information of the high intensity discharge lamp to the setting unit;

a second communication controller configured to be provided in the setting unit and transmit the command to the regulated power supply unit, the second communication controller receiving operation state information of the high intensity discharge lamp to execute processing appropriate to the operation state information;

a reception photo-coupler configured to be connected to a reception terminal of the first communication controller;

a transmission photo-coupler configured to be connected to a transmission terminal of the first communication controller; and a pair of signal lines configured to interconnect the regulated power supply unit and the setting unit via the reception photo-coupler and the transmission photo-coupler, wherein ON/OFF control of the transmission photo-coupler is implemented by a lighting acknowledgement signal that has a predetermined frequency and a predetermined duty ratio and is continuously sent out from the transmission terminal of the first communication controller when the high intensity discharge lamp has been lit normally based on a lighting command transmitted from the setting unit to the regulated power supply unit, so that an output signal of the transmission photo-coupler associated with the ON/OFF control is transmitted to the second communication controller via the signal lines, and the command sent out from a transmission terminal of the second communication controller is transmitted to the first communication controller via the signal lines and the reception photo-coupler during an OFF-period of the transmission photo-coupler.

5. The signal transmission device according to claim 4, wherein the second communication controller includes a constant-current circuit that supplies a current to an output light-receiving element included in the transmission photo-coupler when the output light-receiving element is in an ON-state, and supplies a current to an input light-emitting element included in the reception photo-coupler when the input light-emitting element is in an ON-state.

6. A liquid crystal projector comprising:

a regulated power supply unit configured to operate and control a high intensity discharge lamp;

a setting unit configured to give various kinds of commands to the regulated power supply unit; and a signal transmission circuit configured to carry out communication between the regulated power supply unit and the setting unit, wherein the regulated power supply unit includes a first communication controller that receives the command from the setting unit to control the high intensity discharge lamp based on the command and transmits operation state information of the high intensity discharge lamp to the setting unit, the setting unit includes a second communication controller that transmits the command to the regulated power supply unit and receives operation state information of the high intensity discharge lamp to execute processing appropriate to the operation state information, the signal transmission circuit includes a reception photo-coupler connected to a reception terminal of the first communication controller, a transmission photo-coupler connected to a transmission terminal of the first communication controller, and a pair of signal lines that interconnect the regulated power supply unit and the setting unit via the reception photo-coupler and the transmission photo-coupler, and ON/OFF control of the transmission photo-coupler is implemented by a lighting acknowledgement signal that has a predetermined frequency and a predetermined duty ratio and is continuously sent out from the transmission terminal of the first communication controller when the high intensity discharge lamp has been lit normally based on a lighting command transmitted from the setting unit to the regulated power supply unit, so that an output signal of the transmission photo-coupler associated with the ON/OFF control is transmitted to the second communication controller via the signal lines, and the command sent out from a transmission terminal of the second communication controller is transmitted to the first communication controller via the signal lines and the reception photo-coupler during an OFF-period of the transmission photo-coupler.

7. A signal transmission method for transmitting a signal between a regulated power supply unit that operates and controls a high intensity discharge lamp and a setting unit that gives various kinds of commands to the regulated power supply unit, the method comprising the steps of:

providing a communication/power combined line wired between the regulated power supply unit and the setting unit;

providing the setting unit with a constant-voltage constant-current circuit that supplies power necessary for drive control of the regulated power supply unit via the communication/power combined line;

providing the regulated power supply unit with a first communication controller that receives the command to control the high intensity discharge lamp based on the command and transmits operation state information of the high intensity discharge lamp to the setting unit;

providing the setting unit with a second communication controller that transmits the command to the regulated power supply unit and receives operation state information of the high intensity discharge lamp to execute processing appropriate to the operation state information;

modulating by the first communication controller a constant voltage applied from the constant-voltage constant-current circuit to the communication/power combined line depending on the operation state information to be sent out from the first communication controller to thereby produce a modulated wave arising from changes of a level of the constant voltage to High/Low levels, and transmitting the modulated wave to the second communication controller as a transmission signal; and modulating by the second communication controller a constant voltage applied from the constant-voltage constant-current circuit to the communication/power combined line depending on a command to be sent out from the second communication controller to thereby produce a modulated wave arising from changes of a level of the constant voltage to High/Low levels, and transmitting the modulated wave to the first communication controller as a transmission signal.

8. The signal transmission method according to claim 7, wherein the regulated power supply unit includes a reverse-blocking diode and a charging capacitor that is charged by the constant-voltage constant-current circuit through the communication/power combined line, and power charged to the charging capacitor is supplied to the regulated power supply unit and the first communication controller during data transmission by any of the first and second communication controllers.

9. The signal transmission method according to claim 7, wherein a cycle of communication between the first communication controller and the second communication controller is defined on the basis of start of transmission from one of the communication controllers, and a transmission timing of the first communication controller and a transmission timing of the second communication controller are defined so as to be different from each other, for every cycle of the communication.

10. A signal transmission device for transmitting a signal between a regulated power supply unit that operates and controls a high intensity discharge lamp and a setting unit that gives various kinds of commands to the regulated power supply unit, the device comprising:

a communication/power combined line configured to be wired between the regulated power supply unit and the setting unit;

a constant-voltage constant-current circuit configured to be provided in the setting unit and supply power necessary for drive control of the regulated power supply unit via the communication/power combined line;

a first communication controller configured to be provided in the regulated power supply unit and receive the command to control the high intensity discharge lamp based on the command, the first communication controller transmitting operation state information of the high intensity discharge lamp to the setting unit; and a second communication controller configured to be provided in the setting unit and transmit the command to the regulated power supply unit, the second communication controller receiving operation state information of the high intensity discharge lamp to execute processing appropriate to the operation state information, wherein the first communication controller modulates a constant voltage applied from the constant-voltage constant-current circuit to the communication/power combined line depending on the operation state information to be sent out from the first communication controller to thereby produce a modulated wave arising from changes of a level of the constant voltage to High/Low levels, and transmits the modulated wave to the second communication controller as a transmission signal, and the second communication controller modulates a constant voltage applied from the constant-voltage constant-current circuit to the communication/power combined line depending on a command to be sent out from the second communication controller to thereby produce a modulated wave arising from changes of a level of the constant voltage to High/Low levels, and transmits the modulated wave to the first communication controller as a transmission signal.

11. The signal transmission device according to claim 10, wherein the regulated power supply unit includes a reverse-blocking diode and a charging capacitor that is charged by the constant-voltage constant-current circuit through the communication/power combined line, and power charged to the charging capacitor is supplied to the regulated power supply unit and the first communication controller during data transmission by any of the first and second communication controllers.

12. The signal transmission device according to claim 10, wherein a cycle of communication between the first communication controller and the second communication controller is defined on the basis of start of transmission from one of the communication controllers, and a transmission timing of the first communication controller and a transmission timing of the second communication controller are defined so as to be different from each other, for every cycle of the communication.

13. The signal transmission device according to claim 10, wherein the constant-voltage constant-current circuit has an over-current limiting function based on a fold-back type drooping characteristic.

14. The signal transmission device according to claim 10, wherein a transmission terminal of the second communication controller is coupled to the constant-voltage constant-current circuit via a transmission photo-coupler, and a reception terminal of the second communication controller is coupled to the communication/power combined line via a reception photo-coupler.

15. A liquid crystal projector comprising:

a regulated power supply unit configured to operate and control a high intensity discharge lamp;

a setting unit configured to give various kinds of commands to the regulated power supply unit; and a communication/power combined line configured to be wired between the regulated power supply unit and the setting unit, wherein the setting unit includes a constant-voltage constant-current circuit that supplies power necessary for drive control of the regulated power supply unit via the communication/power combined line, the regulated power supply unit includes a first communication controller that receives the command to control the high intensity discharge lamp based on the command and transmits operation state information of the high intensity discharge lamp to the setting unit, the setting unit includes a second communication controller that transmits the command to the regulated power supply unit and receives operation state information of the high intensity discharge lamp to execute processing appropriate to the operation state information, and the first communication controller modulates a constant voltage applied from the constant-voltage constant-current circuit to the communication/power combined line depending on the operation state information to be sent out from the first communication controller to thereby produce a modulated wave arising from changes of a level of the constant voltage to High/Low levels, and transmits the modulated wave to the second communication controller as a transmission signal, and the second communication controller modulates a constant voltage applied from the constant-voltage constant-current circuit to the communication/power combined line depending on a command to be sent out from the second communication controller to thereby produce a modulated wave arising from changes of a level of the constant voltage to High/Low levels, and transmits the modulated wave to the first communication controller as a transmission signal.

* * * * *